(12) United States Patent
Liaw et al.

(10) Patent No.: US 7,368,509 B2
(45) Date of Patent: May 6, 2008

(54) FUNCTIONAL NORBORNENES AND POLYMERIC DERIVATIVES AND FABRICATION THEREOF

(75) Inventors: Der-Jang Liaw, Taipei (TW); Ching-Cheng Huang, Taipei (TW); Jing-Yang Ju, Taipei (TW); Jiun-Tyng Liaw, Taipei (TW)

(73) Assignee: National Taiwan University of Science & Technology, Taipei (TW)

( * ) Notice: Subject to any disclaimer, the term of this patent is extended or adjusted under 35 U.S.C. 154(b) by 0 days.

(21) Appl. No.: 11/723,896

(22) Filed: Mar. 22, 2007

(65) Prior Publication Data

US 2007/0167580 A1   Jul. 19, 2007

Related U.S. Application Data

(62) Division of application No. 10/777,054, filed on Feb. 13, 2004, now Pat. No. 7,205,359.

(51) Int. Cl.
*C08F 283/14* (2006.01)
*C08F 8/04* (2006.01)

(52) U.S. Cl. ............. 525/308; 525/269; 525/289; 525/303; 525/328.2; 525/329.5; 525/338; 525/940

(58) Field of Classification Search ......... 525/269, 525/303, 308, 338, 288, 289, 328.2, 329.5, 525/940; 526/171
See application file for complete search history.

(56) References Cited

U.S. PATENT DOCUMENTS 3,937,763 A * 2/1976 Ogura et al. ............... 525/211

OTHER PUBLICATIONS

Elyashiv-Barad, et al, Copolymerization of Methyl Acrylate with Norbornene Derivatives by Atom Transfer Radical. Polymerization, Macromolecules, 2002, 35, 7521-7526.*

Der-Jang Liaw and Ching-Cheng Huang, "Preparation of New Diblock Polymeric Materials With Carbazole Groups Derived From The Combination of Living Ring-Opening Metathesis Polymerization and Atom Transfer Radical Polymerization," Polymer Preprints 2003, 44(1), pp. 945-946.

Yeonsuk Roh and Nathan L. Bauld, "Block and Random Living, Ring-Opening Metathesis Copolymerization of Functionally Differentiated Carbazole-Containing Norbornene Monomers," Adv. Synth. Catal. 2002, 344, No. 2, pp. 192-199.

* cited by examiner

*Primary Examiner*—Fred Teskin
(74) *Attorney, Agent, or Firm*—Birch, Stewart, Kolasch & Birch, LLP

(57) ABSTRACT

The present invention relates to novel functional norbornenes as initiators for radical polymerization, its polymer and a process for producing the same. More particularly, the novel functional norbornenes can be selectively polymerized by ring-opening metathesis polymerization or radical polymerization to obtain various polynorbornene derivatives or grafted copolymer materials. The polynorbornene derivatives and grafted copolymer materials not only exhibit excellent functional properties but also enhanced physical and chemical properties after modification. The polynorbornene derivatives and grafted copolymer materials disclosed in the present invention exhibit excellent heat resistance, transparency and water resistance. The present invention also deals with a process for producing such derivatives and materials having controllable molecular weight with narrow molecular weight distribution.

7 Claims, 5 Drawing Sheets

FUNCTIONAL NORBORNENES AND POLYMERIC DERIVATIVES AND FABRICATION THEREOF

CROSS REFERENCE TO RELATED APPLICATIONS

This application is a divisional of U.S. application Ser. No. 10/777,054, filed on Feb. 13, 2004, which issued as U.S. Pat. No. 7,205,359 on Apr. 17, 2007 and all disclosures of the application are incorporated herewith by reference.

BACKGROUND OF THE INVENTION

1. Field of the Invention

The invention relates to a series of high performance polymeric materials derived from norbornene derivatives and particularly to functional norbornenes as initiators for radical polymerization and polymers thereof.

2. Description of the Related Art

Polycarbonate (PC) has commonly been used as macromolecular material for optical purposes. Considerations which may influence the use of the optical material include bireffingence and water adsorption. With the development of high-density compact disks, it has become more difficult for the conventional polymers to meet such requirements.

A commercial material ZEONEX has been developed by Nippon Zeon, a polynorbornene with lower birefringence and water adsorption and improved optical characteristics. Such material can be prepared by ring-opening metathesis polymerization of a norbornene monomer in the presence of a metathesis catalyst and hydrogenated to become a saturated polynorbornene.

With the development of high-density compact disks, a method for producing a new polymeric material with lower birefringence and high transmittance for low wavelength range (blue light) has been developed. Non-crtystallinity of the polynorbornene is such that transmittance with respect to light of wavelength about 400 nm may approach 90%, since no aromatic ring is present in the main chain. In addition, the absence of a hydrophilic functional group in the main chain allows a ratio of water adsorption below 0.01%. Under the same condition, the polynorbornene has water absorption ratio far lower than that of the polycarbonate (PC). Further, glass transition temperatures of the polynorbornene and polycarbonate (PC) fall within the same temperature range (about 123° C.).

Recent attention has been paid to hydrogenated products of polymers produced by ring-opening metathesis polymerization of norbornene-type monomers such as tetracyclododecene, dicyclopentadiene (DCP), and tricyclopentadiene, etc. These hydrogenated products can serve as optical material for use in an optical disk, optical lens, or transparent film, etc. (see JPO60-26024, JPO1-24826, JPO63-264626, EP303, 246, JPO-63-317520 and JPO-1-132656), since such hydrogenated products have excellent transparency and heat resistance and low susceptibility to moisture gain, with comparatively low briefringence and excellent moldability.

Olefin metathesis polymerization is a popular method in polymer synthesis. In recent years, the ring-opening metathesis polymerization of cycloolefin and the metathesis polymerization of non-cyclodiolefin have become very important in polymer synthesis. Along with development of new catalysts, the synthesis method of polymeric materials which contain various functional groups has further developed correspondingly.

While organometallic catalyst use in metathesis polymerization has been popular for some time, the organometallic catalysts are not suitable in metathesis polymerization of the monomer which contains various functional groups and is also sensitive to moisture and oxygen gas. For example, tungsten (W), titanium (Ti), molybdenum (Mo) and ruthenium (Ru) catalysts are the most popular catalysts used in the ring-opening metathesis polymerization of cycloolefin, wherein ruthenium (Ru) catalyst is the most tolerant catalyst with respect to water and oxygen gas in the metathesis polymerization. The metathesis polymerization can be carried out in an aqueous solution in the presence of ruthenium (Ru) catalyst. For example, the catalyst of $\{Cl_2Ru(CHPh)[P(C_6H_{11})_3]_2\}$ developed by Grubbs et al. in 1996 is suitable for ring-opening metathesis polymerization of cycloolefin. More particularly, the polymerization of the monomers with functional groups can be carried out in the presence of such a catalyst because it is stable in air. In addition, such metathesis polymerization provides a high polymerization rate and large molecular weight of resulting polymer. Generally speaking, such reaction has accompanied with living polymerization.

The ring-opening metathesis polymerization of a norbornene-type monomer is carried out, in general, in the presence of a catalyst system consisting of an organometallic compound such as an organoaluminum compound and a tungsten and/or molybdenum-based metathesis catalyst (please refer to JPO46-14910), or a catalyst system containing an organometallic compound such as an organoaluminium compound and a transition-metal compound such as titanium tetrahalide (please refer to JPO41-20111 and JPO50-12199).

However, with use of the first catalyst system, the resultant polymer has a broad distribution of molecular weight and thus high birefringence, despite being obtainable in such high yields, that the residual monomer is minimally present in the reaction system when the reaction is complete.

With use of the second system, the molecular weight distribution of resulting polymer can be easily controlled. However, as the concentration of monomer in the reaction system decreases, the rate of polymerization also decreases accordingly. Hence, polymers by the ring-opening metathesis polymerization (ROMP) of the present catalyst system cannot be obtained in high yields. Moreover, a large amount of unreacted monomer remains in the reaction system when the polymerization has completed. It is very difficult to remove this unreacted monomer during purification of the polymer.

Hence, extensive research has been directed at ring-opening metathesis polymerization (ROMP) of cycloolefin derivatives to improve the reactivity of catalysts, focused on the development of side-chain-type liquid crystal, a triblock copolymer synthesized by two-step method, a polymer with various functional groups and a polymer having cross-linkable functional groups remained in the side chain thereof, etc. The introduction of the functional groups improves the optical characteristics and biochemical activity of the polymer. In addition, the cross-linkable functional groups such as methacryloyl in the side-chain can be introduced and applied as UV curing agent, coating material and photoresist.

Polynorbornene and its derivatives, the first commercial products genereated by ring-opening metathesis polymerization (ROMP), are an important engineering material. The materials are used with shape-memory polymers, shining apparatus, machine, electrical elements, tube, food packages and the like because of good transmittance, wide usable temperature range, good mechanical properties, and excellent moldability. In addition, the derivatives of polynorbornene such as acidic and aromatic polymers can serve as a photoresist for use in semiconductor manufacturing.

Although the polynorbornene and its derivatives have good transmittance, wider usable temperature range, good mechanical properties and excellent moldability, synthesis of new norbornene-type monomers and polymers are not well developed and problems associated therewith not easily overcome. Hence, the development of new norbornene-type monomers and their derivatives has great potential in various applications.

BRIEF SUMMARY OF THE INVENTION

The invention provides functional norbornenes as initiators for radical polymerization, polymers, and fabrication method thereof. More particularly, the polymerization of functional norbornenes in the invention can be selectively carried out by ring-opening metathesis polymerization (ROMP) or radical graft copolymerization to obtain various polynorbornene derivatives (Macromonomer, macroinitiator, homopolymer, random copolymer and block copolymer) or grafted copolymer materials (Branched polymeric materials). The polynorbornene derivatives and grafted copolymer materials exhibit not only excellent functional properties but also enhanced physical and chemical properties after modification.

A initiator was synthesized by the reaction of norbornene methylene amine with 2-bromo-2-methylpropionyl bromide (Scheme I). A macromonomer, polymethylmethacrylate containing norbornyl end group (NBPMMA), was prepared by radical polymerization using NBMBrMP as an initiator (Scheme II). Poly(macromonomer), poly(NBPMMA) with high molecular weight (Mn=6.8×10$^4$) was obtained by polymerizing relatively low molecular weight (Mn=6.4×10$^3$) NBPMMA. Since homopolymerization of NBPMMA macromonomer with average molecular weight (Mn)1.3×10$^4$ did not undergo ring-opening metathesis polymerization (ROMP) with Ru complex {Cl$_2$Ru(CHPh)[P(C$_6$H$_{11}$)$_3$]$_2$}, ring-opening metathesis copolymerization of macromonomer containing norbornene end group (NBPMMA) and norbornene derivative containing carbazole group (NBCbz) was investigated. The random copolymer, poly(NBPMMA-co-NBCbz) with number-average molecular weight (Mn) 4.8×10$^4$ and molecular weight distribution (PDI) 1.78 (Scheme III) was successfully obtained. Fluorescent spectrum of poly(NBPMMA-co-NBCbz) exhibited strong emissions at 370 nm, 385 nm, 410 nm and 440 nm due to carbazole group. Poly(NBPMMA-co-NBCbz) did not exhibit Tg; however, NBPMMA macromonomer (Mn=1.3×10$^4$) exhibited Tg at 110° C. due to polymethylmethacrylate segment. In addition, a new macroinitiator, poly(HNBM-BrMP), for radical polymerization was also synthesized by ROMP and hydrogenated (Scheme IV). Graft copolymerization of poly(HNBMBrMP) with MMA was carried out in diluted macroinitiator solution ([poly(HNBMBrMP)]= 3.64×10$^{-2}$ mol.L-1 in toluene) to yield poly(HNBMBrMP-g-PMMA) [Mn=2.0×10$^4$, PDI=1.9] (Scheme IV). The signals of amide hydrogen (6.7 ppm), PMMA segment [—CH$_2$C(CH$_3$)COOCH$_3$: 1.8~1.9 ppm, —CH2C(CH3) COOCH3 : 0.9~1.6 ppm and —CH2C(CH3)COOCH$_3$: 3.4 ppm] appeared in the 1HnmR spectrum. The GPC results and the 1HnmR spectral data confirmed the formation of the poly(HNBMBrMP-g-PMMA).

Scheme I. Synthesis and ring-opening metathesis polymerization of NBMBrMPA

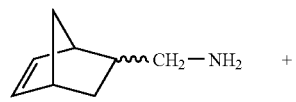

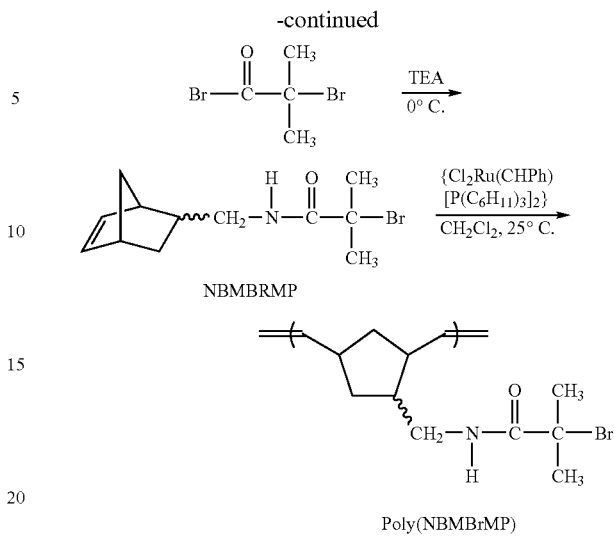

NBMBRMP

Poly(NBMBrMP)

Scheme II. Preparation of macromonomer (NBPMMA)

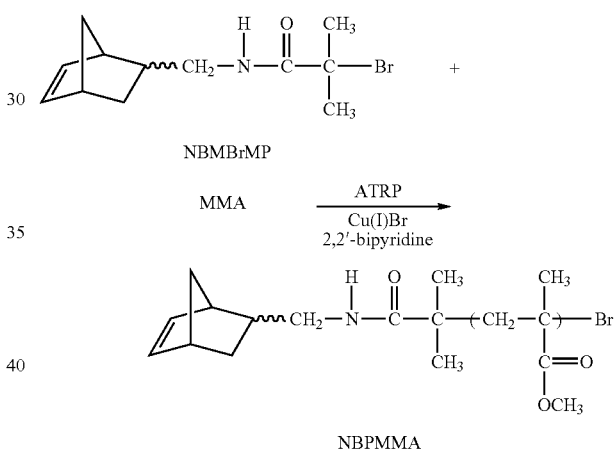

NBMBrMP

NBPMMA

Scheme III. Ring-opening metathesis polymerization of NBCbz and NBPMMA

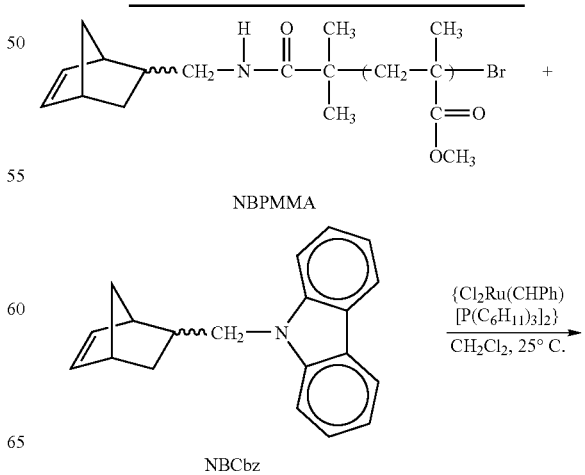

NBPMMA

NBCbz

-continued

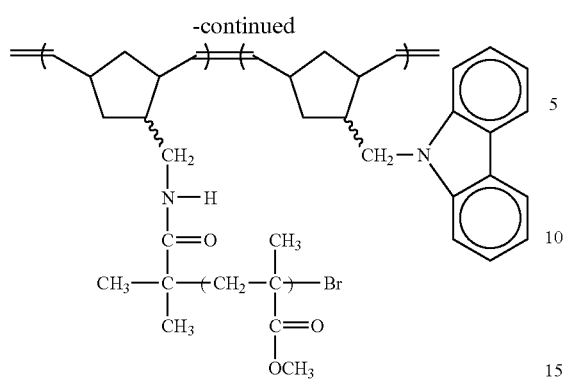

Scheme IV. Synthesis of poly(HNBMBrMPA) and poly(HNBMBrMPA-g-PMMA)

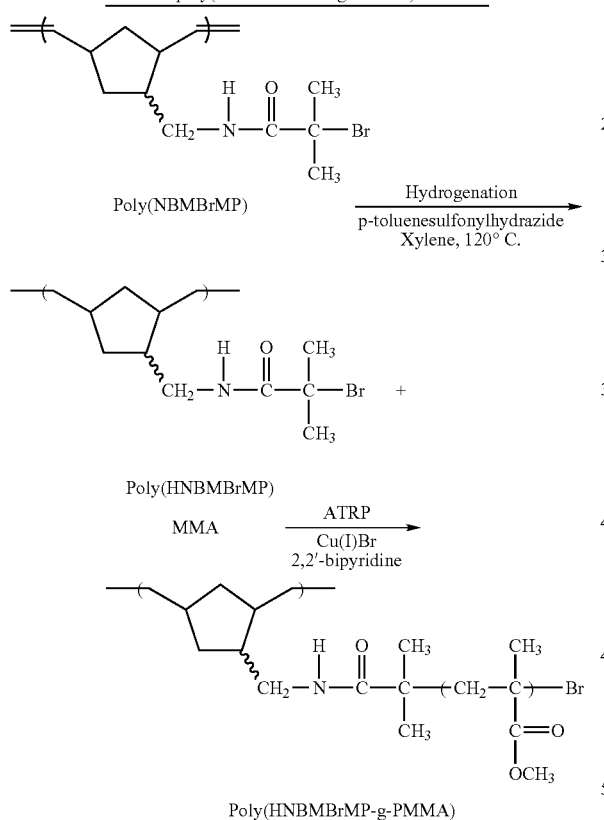

A first aspect of the invention comprises synthesis of a diblock macroinitiator containing polynorbornene and carbazole segments. The diblock macroinitiator containing norborene and carbazole segments is represented by:

(I)

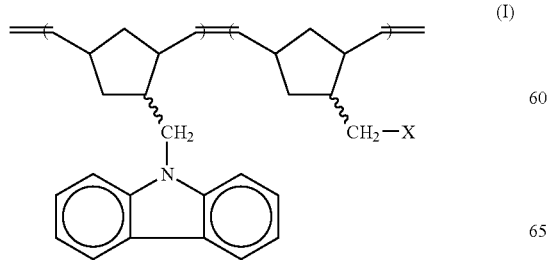

wherein X is Br or Cl. Preferably, the diblock macroinitiator is presented from a mixture of cabazole-containing norbornene-type monomer (II) in the presence of a catalyst via ring-opening metathesis polymerization(ROMP). An additional norbornene derivative(III) was added to the reaction mixture after 15~120 mins of ring-opening metathesis polymerization (ROMP) and the diblock macroinitiator is obtained.

(II)

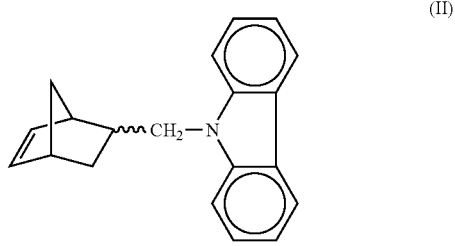

(III)

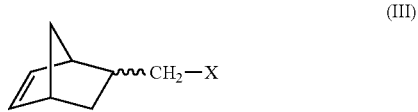

wherein X is Br or Cl. More preferably, the metathesis catalyst is $\{Cl_2Ru(CHPh)[P(C_6H_{11})_3]_2\}$.

A second aspect of the invention, a polynorbornene-containing grafted copolymer comprising the formula (IA) is presented. The polynorbornene-containing graft copolymer is prepared using a diblock macroinitiator with the formula (I):

(I)

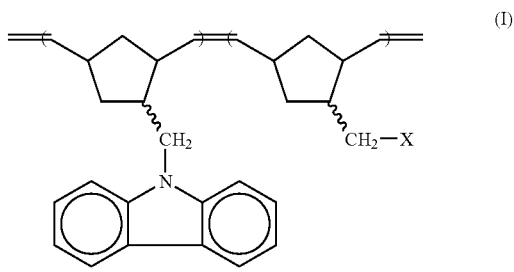

(IA)

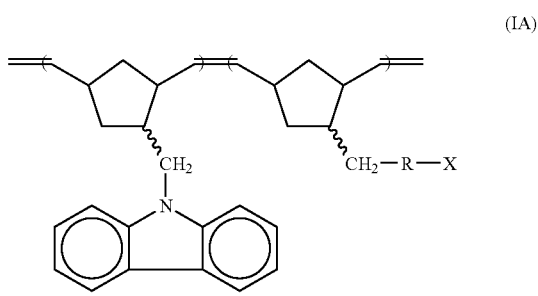

wherein X is Br or Cl; and
R is

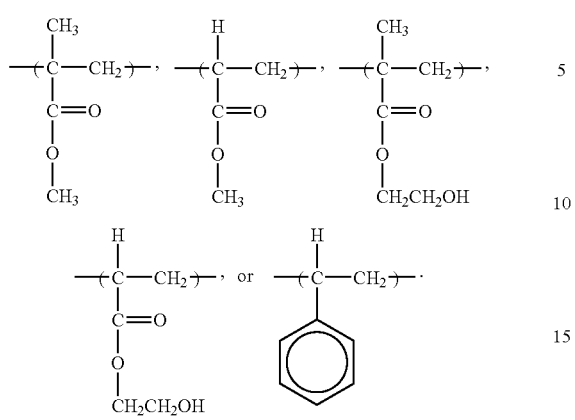

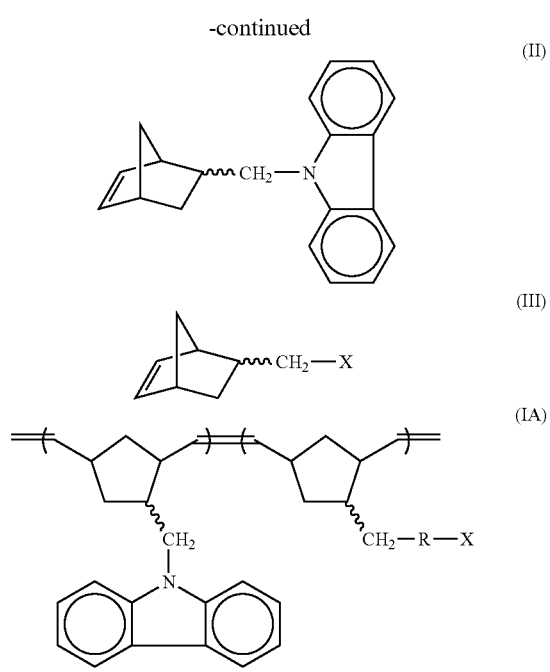

wherein X is Br or Cl; and
R is

A third aspect of the invention is the development of a process for preparation of a grafted polynorbornene with the formula (IA), comprising preparation of a macroinitiator with the formula (I) by reaction of cabazole-containing norbornene-type monomer (II) and a catalyst via ring-opening metathesis polymerization and an additional norbornene dervative(III) being added to the mixture after 15~120 mins of commencing ring-opening metathesis polymerization, preparation of a mixture of Cu(I)Br, 2,2'-bipyridine, the macroinitiator (I) and a monomer comprising

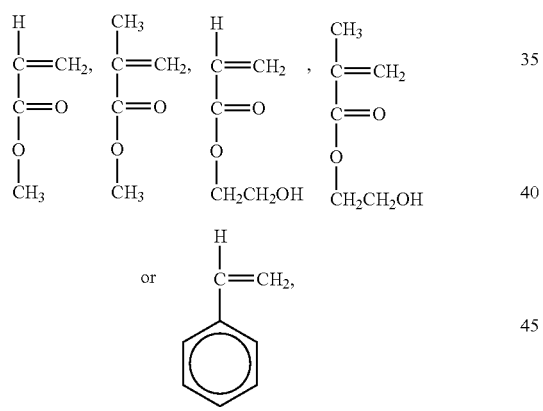

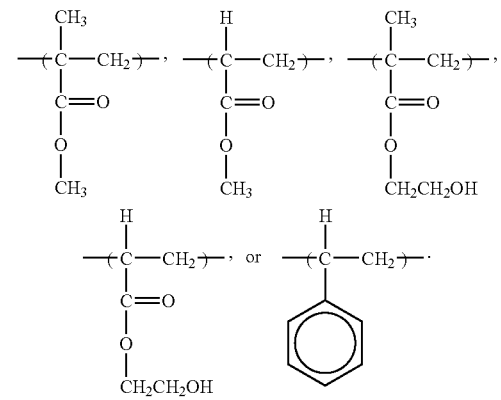

and preparation of the grafted polynorbornene copolymer with the formula (IA) by a graft copolymerization of the mixture under thermally activated condition and temperatures from 50 to 150° C., wherein A fourth aspect of the invention comprises synthesis of a thermally-stable saturated cyclic aliphatic diblock macroinitiator comprising the formula (IV). The thermally-stable saturated cyclic aliphatic diblock macroinitiator is prepared by hydrogenating a diblock macroinitiator with the formula (I):

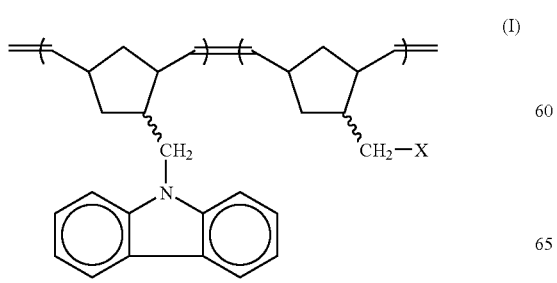

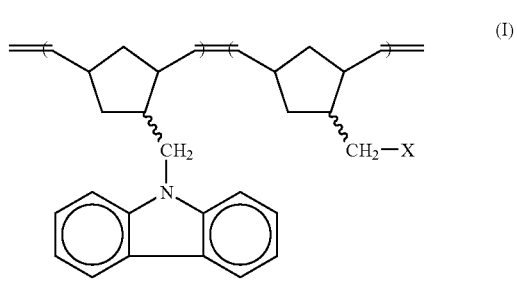

-continued

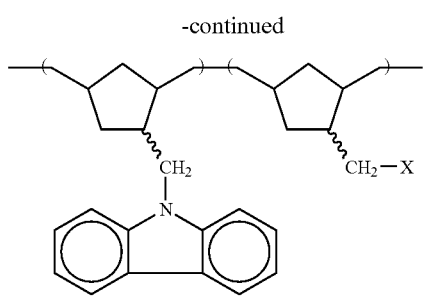
(IV)

wherein X is Br or Cl.

A fifth aspect of the invention comprises synthesis of a polynorbornene-containing grafted copolymer comprising the formula (IVA). The polynorbornene-containing grafted copolymer (IVA) is prepared by graft copolymerization of a diblock macroinitiator with the formula (IV):

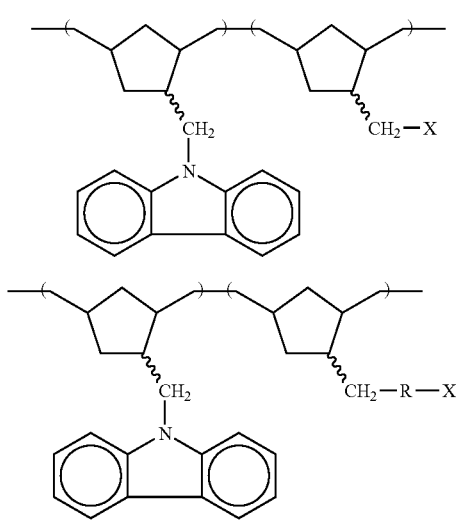
(IV)

(IVA)

wherein X is Br or Cl; and
R is

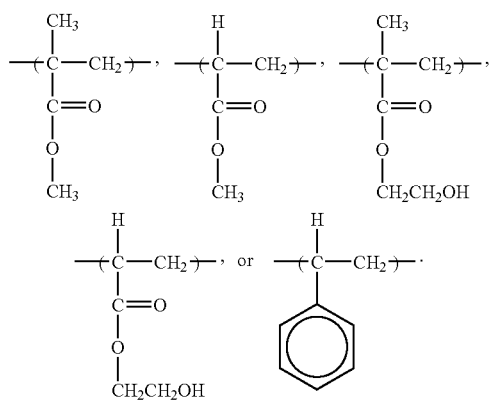

A sixth aspect of the invention comprises a process for preparing a grafted polynorbornene with the formula (IVA), comprising preparation of a macroinitiator with the formula (I) by reaction of cabazole-containing norbornene-type monomer (II) and a catalyst via ring-opening metathesis polymerization and addition of additional norbornene dervative(III) to the reaction mixture after 15~120 mins of ring-opening metathesis polymerization, hydrogenation of the diblock macroinitiator with the formula (I) to prepare a thermaly-stable saturated cyclic aliphatic diblock macroinitiator with the formula (IV),preparation of a mixture of Cu(I)Br, 2,2'-bipyridine, the thermally-stable saturated cyclic aliphatic diblock macroinitiator (IV) and a monomer of

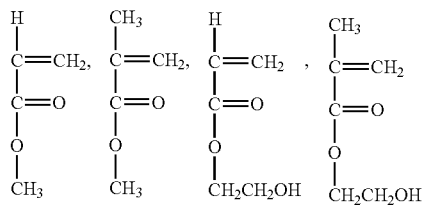

or 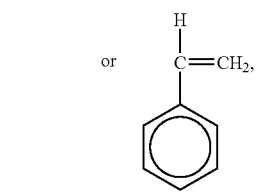

and preparation of the grafted polynorbornene copolymer with the formula (IVA) by graft copolymerization of the mixture at various temperatures from 50 to 150° C., wherein

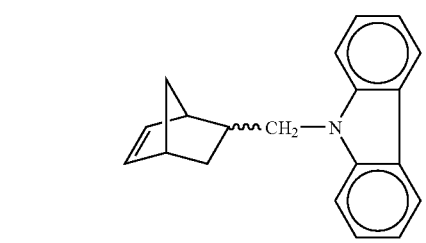
(II)

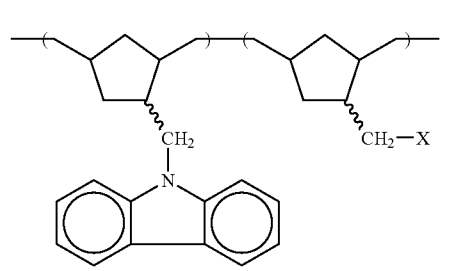
(IV-1)

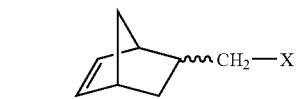
(III)

-continued

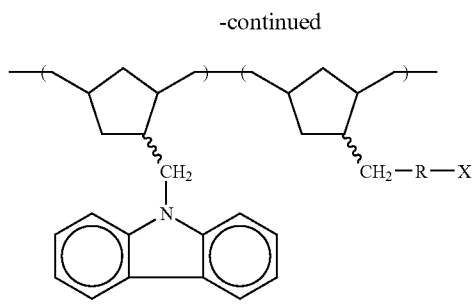

wherein X is Br or Cl; and
R is

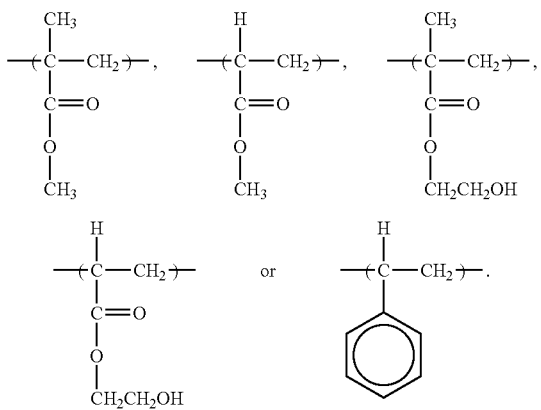

A seventh aspect of the invention comprises synthesis of a norbornene-containing macrmonomer comprising formula (V), prepared using a norbornene end group-containing initiator with the formula (III):

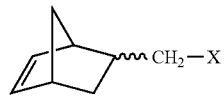 (III)

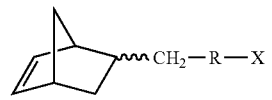 (V)

wherein X is Br or Cl; and
R is

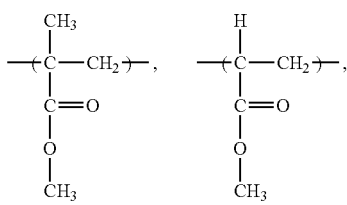 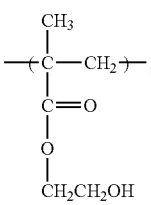

-continued

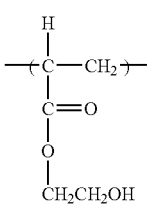 or 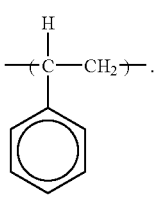.

An eighth aspect of the invention comprises synthesis of a norbornene end group-containing macrmonomer with the formula (V), comprising preparation of a mixture of Cu(I) Br, 2,2'-bipyridine, a norbornene-type initiator (III) and a monomer of

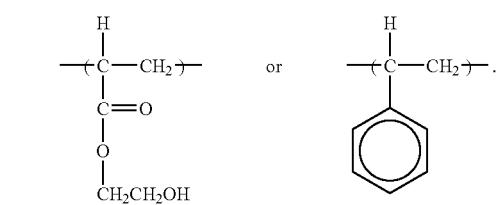

and preparation of the norbornene end group-containing macromonomer with the formula (V) by radical polymerization of the mixture at various temperatures from 50 to 150° C., wherein

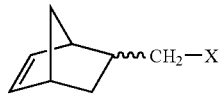 (III)

CH₂—R—X (V)

wherein X is Br or Cl; and
R is

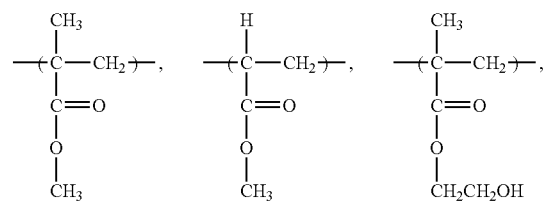

-continued

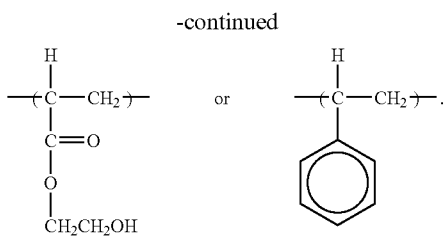

A ninth aspect of the invention comprises preparation of norbornene-type macroinitiator comprising the formula (VI), by ring-opening metathesis polymerization using a catalyst and a norbornene-type dervative with the formula (III):

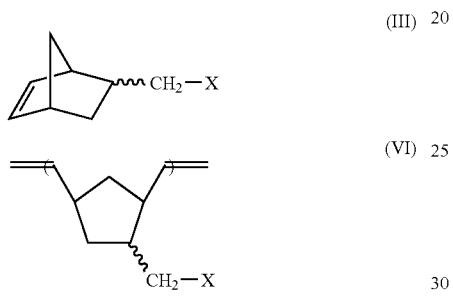

wherein X is Br or Cl.

A tenth aspect of the invention comprises a polynorbornene-containing grafted copolymer comprising the formula (VII), prepared by graft copolymerization using a macroinitiator with the formula (VI):

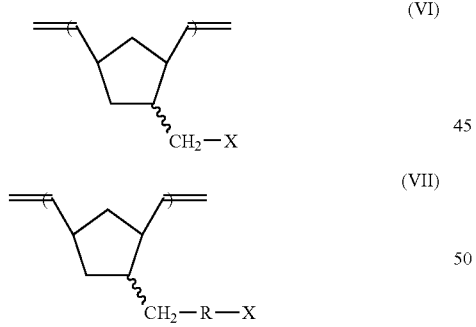

wherein X is Br or Cl; and
R is

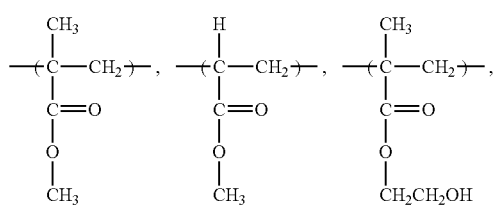

-continued

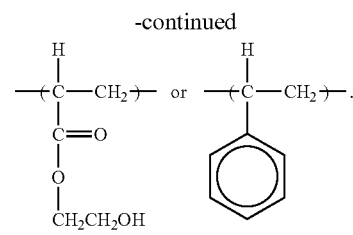

An eleventh aspect of the invention comprises synthesis of a saturated cyclic aliphatic polynorbornene-containing grafted copolymer comprising the formula (IX), prepared by graft copolymerization using a saturated cyclic aliphatic macroinitiator with the formula (VIII):

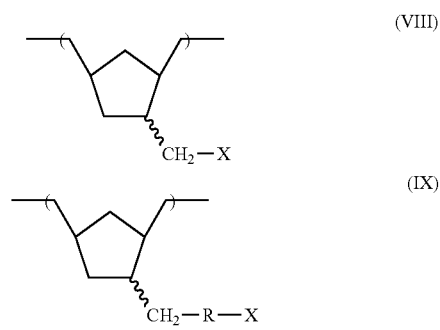

wherein X is Br or Cl; and
R is

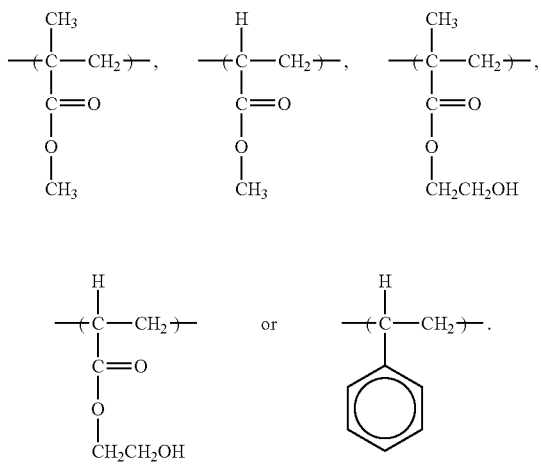

A twelfth aspect of the invention, a process for preparing grafted polynorbornene copolymer with the formula (VII) is revealed. The process for preparation of grafted polynorbornene copolymer (VII) comprises of following steps:

a) polymerization of a norbornene monomer with the formula (III) by ring-opening metathesis polymerization using a catalyst to obtain a macroinitiator with the formula (VI);

b) preparation of a mixture of Cu(I)Br, 2,2'-bipyridine, the macroinitiator (VI) and a monomer of

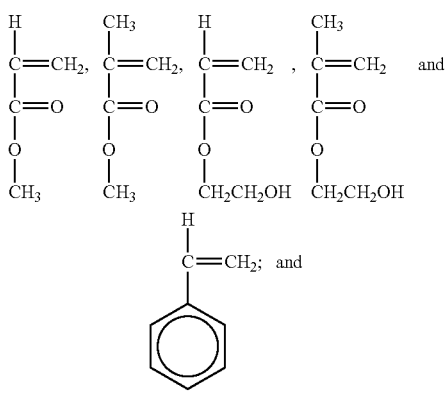

c) preparation of the grafted polynorbornene copolymer with the formula (VII) by a graft copolymerization of the mixture at various temperatures from 50 to 150° C., wherein

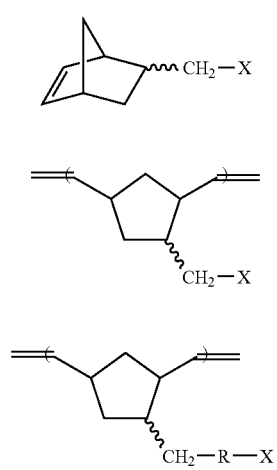

wherein X is Br or Cl; and
R is

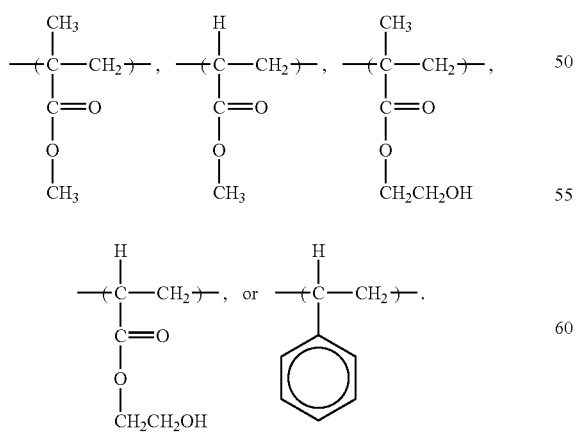

A thirteenth aspect of the invention comprises a process for preparing grafted polynorbornene copolymer with the formula (IX) comprises polymerization of a norbornene monomer with the formula (III) by ring-opening metathesis polymerization using a catalyst to obtain a macroinitiator with the formula (VI), preparation of a mixture of Cu(I)Br, 2,2'-bipyridine, the macroinitiator (VI) and a monomer of

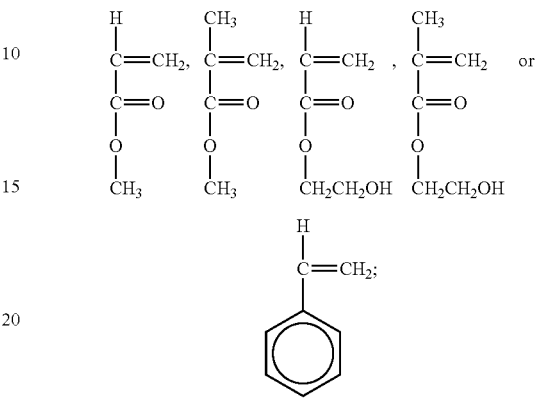

hydrogenation of the macroinitiator with the formula (VII) to prepare a thermally-stable saturated cyclic aliphatic macroinitiator with the formula (VIII), and preparation of a grafted polynorbornene with the formula (IX) by radical polymerization of the mixture at various temperatures from 50 to 150° C., wherein

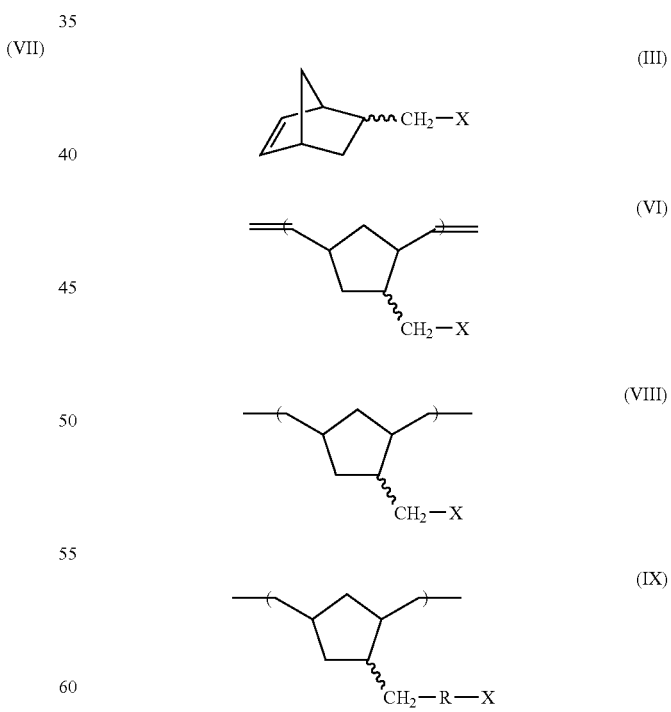

wherein X is Br or Cl; and
R is

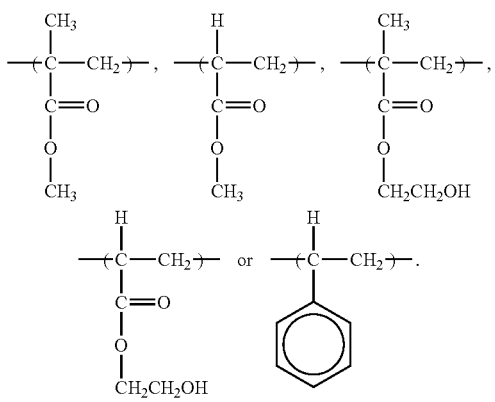

A fourteenth aspect of the invention comprises synthesis of a norbornene-type compound containing bromo-end group with the formula (XI):

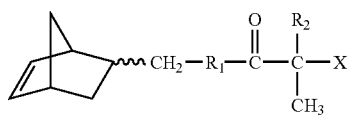

wherein X is Br or Cl;
$R_1$ is —NH—, —O—, —($CH_2$)n-NH—, or —($CH_2$)n-O—,
wherein n denotes an integer from 1 to 4; and
$R_2$ is H or —$CH_3$.

A fourteenth aspect of the invention comprises a polynorbornene-type macroinitiator containing halogen-side group, with the formula (XII):

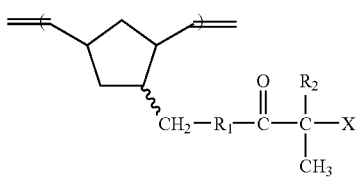

wherein X is Br or Cl;
$R_1$ is —NH—, —O—, —($CH_2$)n-NH—, or —($CH_2$)n-O—,
wherein n denotes an integer from 1 to 4; and
$R_2$ is H or —$CH_3$. Preferably, the macroinitiator is prepared from a halogen-containing norbornene-type compound (XI) in the presence of catalyst via ring-opening metathesis polymerization, wherein

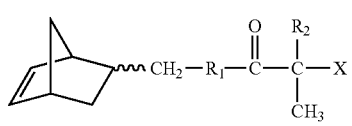

More preferably, the metathesis catalyst is $\{Cl_2Ru(CHPh)[P(C_6H_{11})_3]_2\}$.

A fifteenth aspect of the invention comprises a thermally-stable saturated cyclic aliphatic macroinitiator comprising the formula (XIII), prepared by hydrogenating a macroinitiator with the formula (XII):

(XII)

(XIII)

wherein X is Br or Cl;
$R_1$ is —NH—, —O—, —($CH_2$)n-NH—, or —($CH_2$)n-O—, wherein n denotes an integer from 1 to 4; and
$R_2$ is H or —CH3.

A sixteenth aspect of the invention comprises a grafted polynorbornene copolymer comprising the formula (XIV), prepared by graft copolymerization using a macroinitiator with the formula (XIII):

(XIII)

(XIV)

wherein X is Br or Cl;
$R_1$ is —NH—, —O—, —($CH_2$)n-NH—, or —($CH_2$)n-O—,
wherein n denotes an integer from 1 to 4;
$R_2$ is H or —$CH_3$;, or
R is

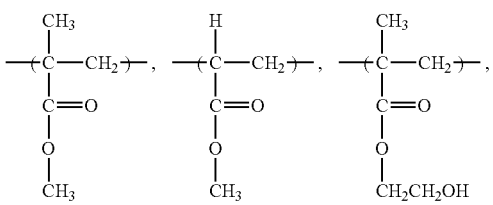

-continued

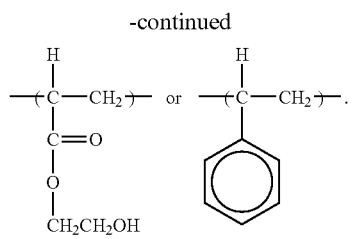

A seventeenth aspect of the invention comprises a process for preparing grafted polynorbornene copolymer with the formula (XIV), comprising polymerization of a norbornene monomer with the formula (XI) by ring-opening metathesis polymerization using a catalyst to obtain a macroinitiator with the formula (XII), hydrogenation of the macroinitiator with the formula (VII) to prepare a thermally-stable saturated cyclic aliphatic macroinitiator with the formula (VIII), preparation of a mixture of Cu(I)Br, 2,2'-bipyridine, the thermally-stable saturated cyclic aliphatic macroinitiator (VIII) and a monomer of

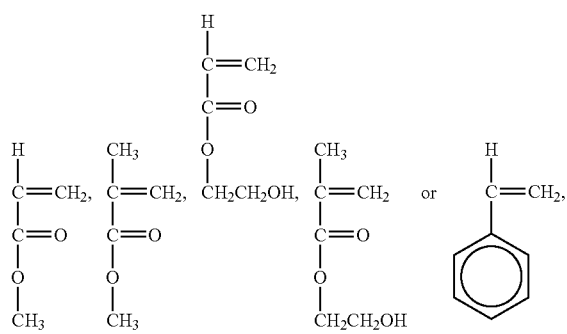

and preparation of a grafted polynorbornene with the formula (XIV) by radical polymerization of the mixture at various temperatures from 50 to 150° C., wherein

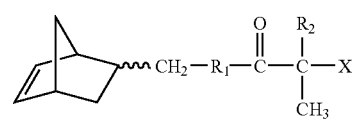
(XI)

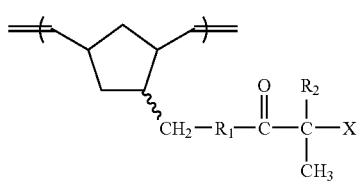
(XII)

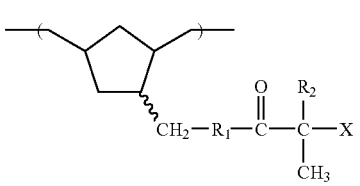
(XIII)

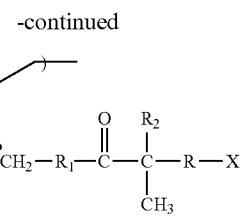
(XIV)

wherein X is Br or Cl;

$R_1$ is —NH—, —O—, —(CH$_2$)n-NH—, or —(CH$_2$)n-O—, wherein n denotes an integer from 1 to 4;

$R_2$ is H or —CH$_3$;, or

R is

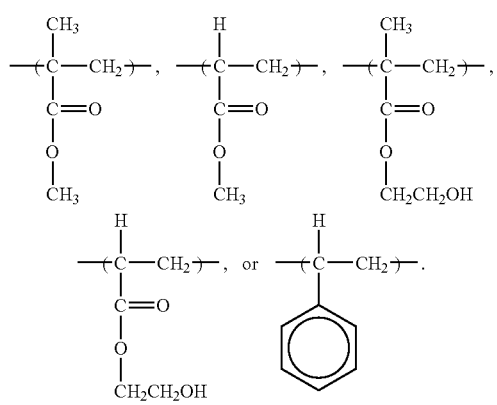

An eighteenth aspect of the invention comprises a process for preparing grafted polynorbornene copolymer with the formula (XIVA), comprising polymerization of a norbornene monomer with the formula (XI) by ring-opening metathesis polymerization using a catalyst to obtain a macroinitiator with the formula (XII), hydrogenation of the macroinitiator with the formula (XII) to prepare a thermally-stable saturated cyclic aliphatic macroinitiator with the formula (XIII), preparation of a mixture of Cu(I)Br, 2,2'-bipyridine, the thermally-stable saturated cyclic aliphatic macroinitiator (VIII) and a monomer of

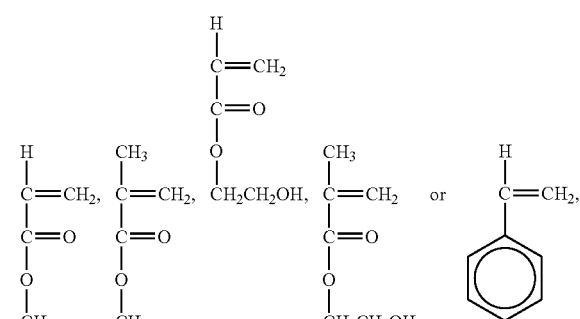

and preparation of a grafted polynorbornene with the formula (XIVA) by radical polymerization of the mixture at various temperatures from 50 to 150° C., wherein

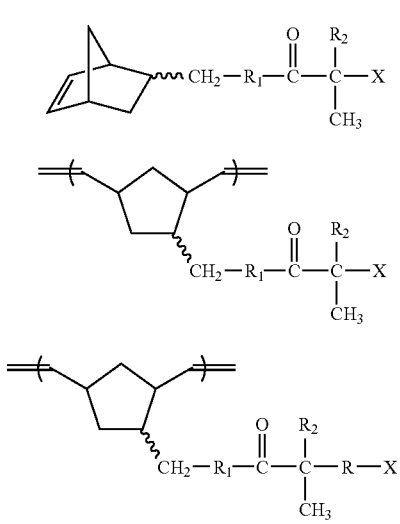

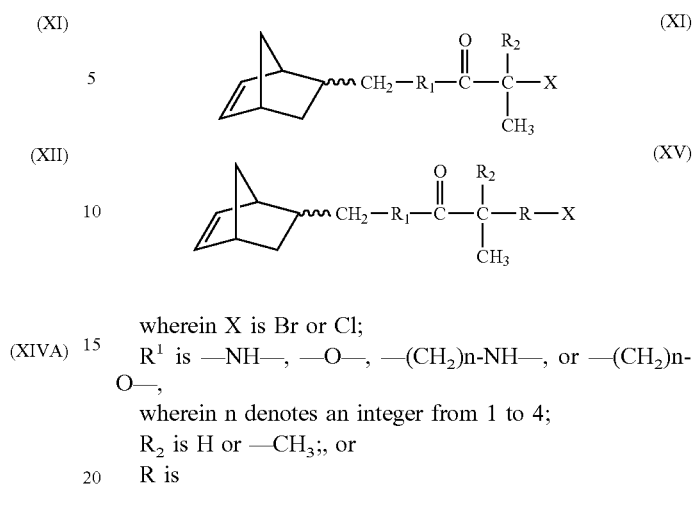

wherein X is Br or Cl;
R$^1$ is —NH—, —O—, —(CH$_2$)n-NH—, or —(CH$_2$)n-O—,
wherein n denotes an integer from 1 to 4;
R$_2$ is H or —CH$_3$;, or
R is

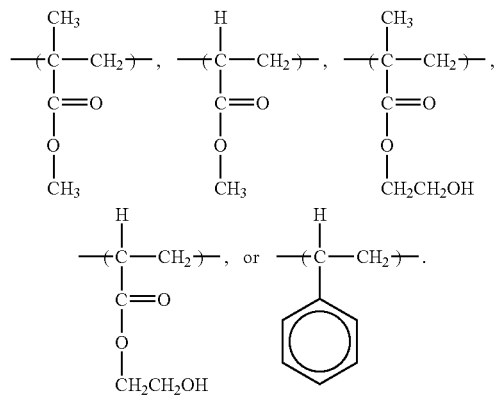

A twentieth aspect of the invention comprises a norbornene end group-containing macromonomer comprising formula (XV):

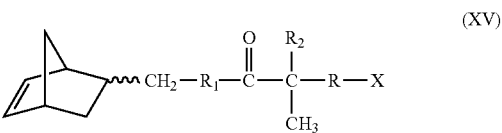

wherein X is Br or Cl;
R$_1$ is —NH—, —O—, —(CH$_2$)n-NH—, or —(CH$_2$)n-O—,
wherein n denotes an integer from 1 to 4;
R$_2$ is H or —CH$_3$;, or
R is

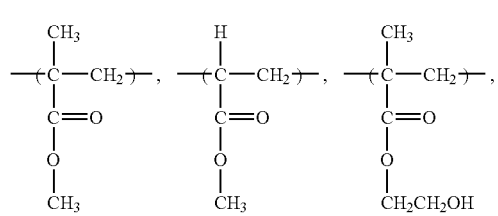

wherein X is Br or Cl;,
R$_1$ is —NH—, —O—, —(CH$_2$)n-NH—, or —(CH$_2$)n-O—
wherein n denotes an integer from 1 to 4;
R$_2$ is H or —CH$_3$;, or
R is

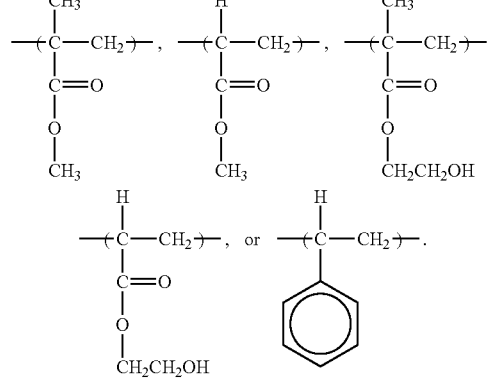

A nineteenth aspect of the invention comprises a process for preparing norbornene end group-containing macromonomer with the formula (XV), comprising preparation of a mixture of Cu(I)Br, 2,2'-bipyridine, a norbornene derivative (XI) and a monomer of

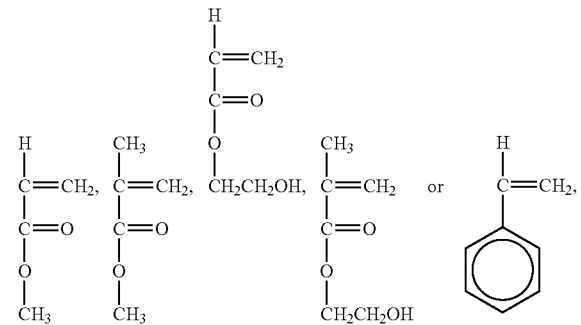

and preparation of a norbornene end group-containing macromonomer with the formula (XV) by radical polymerization of the mixture at various temperatures from 50 to 150° C., wherein -continued

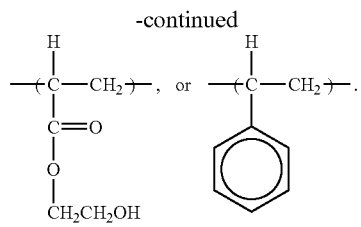

A twenty first aspect of the invention comprises a copolymer containing carbazole and halo-side groups, comprising formula (XVI):

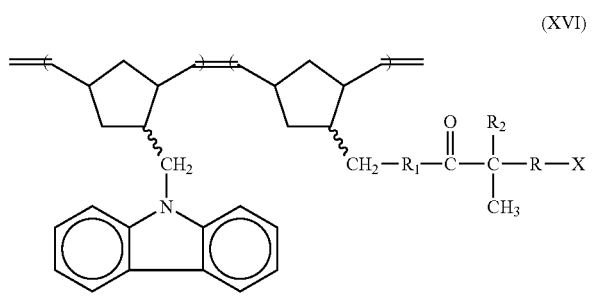

(XVI)

wherein X is Br or Cl;
$R_1$ is —NH—, —O—, —(CH$_2$)n-NH—, or —(CH$_2$)n-O—,
wherein n denotes an integer from 1 to 4;
$R_2$ is H or —CH$_3$;, or
R is

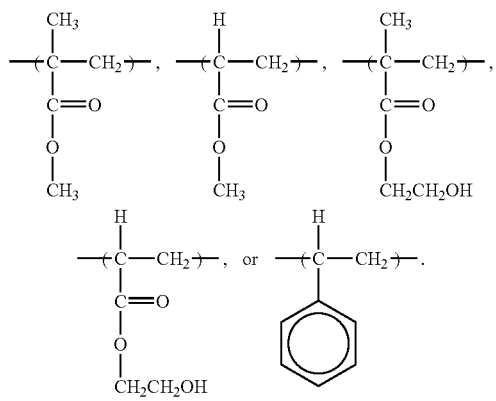

Preferably, the copolymer macroinitiator is prepared from a mixture of cabazole-containing norbornene-type monomer (II) and a macromonomer with the formula (XV) in the presence of catalyst via ring-opening metathesis polymerization, wherein

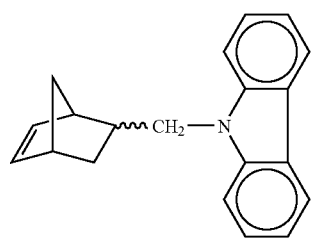

(II)

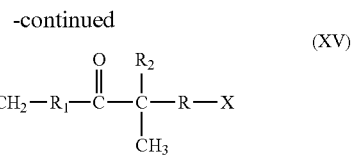

(XV)

wherein X is Br or Cl;
$R_1$ is —NH—, —O—, —(CH$_2$)n-NH—, or —(CH$_2$)n-O—,
wherein n denotes an integer from 1 to 4;
$R_2$ is H or —CH$_3$;, or
R is

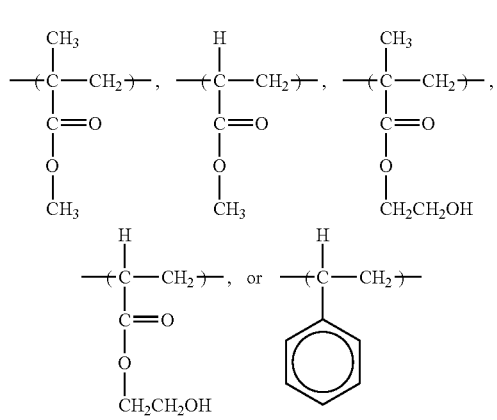

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1A:
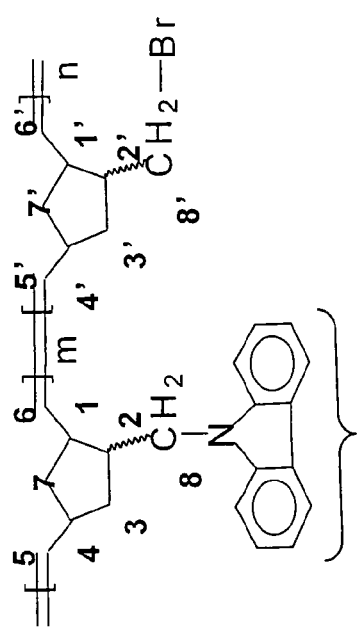
FIG. 1 and FIG. 1A show 400 MHz 1HnmR spectrum of diblock copolymer, poly(CbzNB-b-NBMBr), containing carbazole groups and bromo-containing polynorbornene segments (CDCl$_3$).

The norbornene monomers of the invention were prepared by Diels-Alder reaction at 180° C. in a high pressure reactor. Diels-Alder reaction was the reaction between diene and alkene to form forming a new cycloalkene monomer. The reaction is not limited to the high-pressure reactor; all well-known process for Diels-Alder reaction may be used in the invention. After obtaining norbornene monomers with vinyl side chain or epoxy groups, polymers were further prepared by ring-opening metathesis polymerization (ROMP) of the monomers, such that various polymers may be prepared by reactions of different olefin groups and radicals.

The invention discloses a norbornene-type monomer as an initiator for radical polymerization, its polymer and fabrication method thereof. For example, a series of macromonomer, macroinitiator, grafted copolymer, random copolymers and diblock copolymers are disclosed.

First, halogen-containing norbornene-type initiators were prepared. Such norbornene-type initiators can be copolymerized with various functional norbornene-type monomers and the resulting copolymer-type initiators used to initiate radical polymerization of methyl methacrylate and styrene for preparation of high performance polymeric materials.

According to the invention, the norbornene-type halogen-containing compounds were prepared by Diels-Alder reaction in autoclaves at about 180° C. The Diels-Alder reaction is a reaction of diolefin and olefin monomers for producing cycloolefin derivatives. A series of ring-opened polymers, macroinitiator and grafted copolymers can be produced by ring-opening metathesis polymerization of the dislosed norbornene-type monomer.

The norbornene-type monomers disclosed can also be combined with other conventional monomers capable of undergoing ring-opening copolymerization to form copolymers, if desirable. Examples of known norbornene-type monomers include norbornene and alkyl, alkylidene and/or aryl-substituted compounds thereof, such as 5-methyl-2-norbornene, 5,6-dimethyl-2-norbornene, 5-ethyl-2-norbornene, 5-butyl-2-norbornene, 5-ethylidene-2-norbornene, 5-phenyl-2-norbornene; dicyclopentadiene, 2,3-dihydrodicyclopentadiene and substituted compounds thereof with alkyl such as methyl, ethyl, propyl, butyl, or the like; dimethanooctahydronaphthalene and alkyl, alkylidene and/or aryl-substituted compound thereof, such as 6-methyl-1,4:5,8-dimethanol-1,4,4a,5, 6,7,8,8a-octahydronaphthalene, 6-ethyl-1,4:5,8-dimethanol-1,4,4a,5,6,7,8,8a-octahydronaphthalene, 6-ethylidene-1,4:5,8-dimethanol-1,4,4a,5, 6,7,8,8a-octahydronaphthalene, 6-phenyl-1,4:5,8-dimethanol-1,4,4a,5,6,7,8,8a-octahydronaphthalene, etc.; trimers and tetramers of cyclopentadiene such as 4,9:5,8-dimethano-3a,4,4a,5,8,8a,9,9a-octabydro-1H-benzonindene, 4,11:5,10:6,9-trimethanol-3a,4,4a,5,5a,6,9,9a,10,10a, 11,11a,22a-dodecahydro-1H-cyclopentaanthrace, etc.

In addition, the monomer may have a polar substituent or a substituent having a metal atom. Examples of such a substituent include halogen atoms such as chlorine, bromine and fluorine, ester-type moieties such as methoxycarbonyl, ethoxycarbonyl and acetoxy groups, a cyano group, and a pyridyl group.

Conditions for ring-opening metathesis polymerization are described in detail as follows.

Metathesis Catalyst

Examples of tungsten and/or molybdenum-based metathesis catalysts include halides, oxyhalides or oxyorganic compounds thereof. Specific examples thereof are tungsten hexachloride, tungsten (IV) oxycholride, tungsten tetrachloride, molybdenum pentachloride, acetylacetonatomolybdenum oxide, etc. In the invention, the catalyst used for ring-opening metathesis polymerization (ROMP) is preferably $\{Cl_2Ru(CHPh)[P(C_6H_{11})_3]_2\}$.

Solvent

The ring-opening polymerization of the norbornene-type monomer in this invention may be carried out in the absence of a solvent. However, it is generally carried out in an inert organic solvent.

For organic solvent, hydrocarbon solvents are preferred with cyclic hydrocarbon solvents better able to dissolve the polymers formed by the ring-opening polymerization particularly preferred. Specific examples thereof include aromatic hydrocarbons such as benzene, ethylbenzene, toluene, xylene, etc.; aliphatic hydrocarbons such as n-pentane, hexane, heptane, etc.; alicyclic hydrocarbons such as cyclopentane, cyclohexane, methylcyclohexane, dimethylcyclohexane, decalin, etc.; hydrocarbon halides such as methylene dichoride, dichloroethane, dichloroethylene, tetrachloroethane, chlorobenzene, dichlorobenzene, trichlorobenzene, etc., or a combination thereof.

The quantity of solvent is based on 1 part by weight of the monomer, usually 1 to 20 parts by weight, preferably 2 to 10 parts by weight.

Polymerization Temperature

Temperatures for the ring-opening polymerization are not specially limited, preferably between −20° C. and 100° C., more preferably between 0° C. and 100° C. and most preferably between 10° C. and 80° C.

Pressure for Polymerization System

The pressure for the polymerization ranges from 0 to 50 kg/cm², preferably from ambient pressure to 10 kg/cm2 and more preferably not more than 5 kg/cm².

Atmosphere for Polymerization System

The ring-opening polymerization is usually carried out in the presence of an inert gas such as nitrogen, argon, or the like.

EXAMPLES

The invention is described further in detail as follows with reference to examples, but is not limited thereto.

Bromo end group-containing norbornene-type monomer can be polymerized by ring-opening metathesis polymerization(ROMP) to obtain polymeric materials. Selectively, the bromo end group-containing norbornene-type monomer can be used as an initiator to prepare various functional polymeric materials by polymerization of vinyl group-containing monomers.

EXAMPLES

The invention is described further in detail as follows with reference to examples, but is not limited thereto.

Example 1

Preparation of Halogen-Containing Functional Norbornene

The synthesis of (2-chloro methyl)bicyclo [2,2,1] hept-2-ene (norbornene methylene chloride; NBMCl) (bp=54~56°

C./11 mmHg) and (2-bromo methyl)bicyclo [2,2,1] hept-2-ene (norbornene methylene bromide; NBMBr) (bp=75~78° C./13 mmHg ) was accomplished via the Diels-Alder condensation of freshly cracked dicyclopentadiene and corresponding allyl chloride and allyl bromide, respectively.

Preparation of halogen-containing functional norbornenes (NBMCl and/or NBMBr) was as follows:

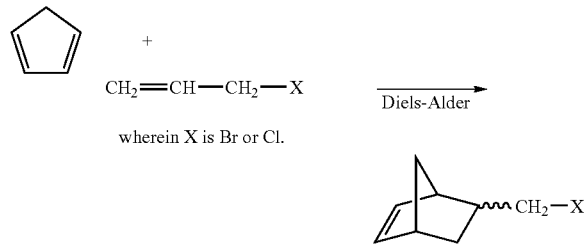

wherein X is Br or Cl.

Example 2

Preparation of carbazole-containing norbornene-type monomer 12 g of potassium hydroxide (KOH) and 30 g of carbazole was added to 200 ml of xylene. A potassium carbazole salt can be produced by removing the water as a azeotrope by boiling with xylene from the solution. The xylene was removed from the solution and replaced by DMF to act as a solvent. 25 g of 5-chlormethyl-2-norbornene was added to the solution, followed by refluxing for about 12 hours. After 12 hours, the resulting solution was added to 200 ml of water and the mixture extracted with 100 ml of ethyl acetate three times. After removing the ethyl acetate from the mixture by distillation, the residue obtained was purified by silica gel column chromatography using a mixture of solvent containing ethyl acetate and n-hexane (ethyl acetate and n-hexane=1:6) as eluant. The carbazole-containing norbornene-type compound (the ratio of endo isomer: exo isomer is 3:2) with melting point of about 74-76° C. was purified by recrystallization using hexane as solvent. The carbazole-containing norbornene-type monomer had the formula (i):

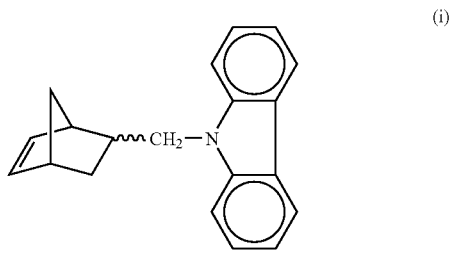

(i)

$^{13}$C-NMR analysis (CDCl$_3$) δ (ppm): 140.4, 138.3, 136.5, 136.1, 132.4, 125.5, 122.7, 120.1, 118.6, 108.8, 50.0, 48.1, 47.0, 45.0, 44.5, 44.0, 42.6, 41.8, 39.0, 38.6, 30.8, 30.5. IR spectrum analysis (KBr PELLET. cm$^{-1}$): 1587(v C=C, vinylic), 1647, 1478(v C=C, aromatic stretching), 1324(v C—N,), 745, 718(2) C—H, carbazole ring out of plane). UV spectrum analysis (THF): λ max=236.2 nm, ε=4.19×10$^4$ Lmole$^{-1}$cm$^{-1}$. Elemental analysis (C$_{20}$H$_{19}$N): Calculated. C: 87.87% H: 7.01%, N:5.12%. Found. C:87.58%, H:7.08%, N:5.31%.

Example 3

Preparation of Carbazole-Containing Diblock Macroinitiator Having Various Segment Lengths Via ROMP Using {RuCl$_2$(CHPh)[P(C$_6$H$_{11}$)$_3$]$_2$} as a catalyst The monomer, CbzNB, can be polymerized by living ROMP. New macroinitiator, poly(CbzNB-b-NBMBr), for radical polymerization was synthesized by ROMP. A solution of catalyst was prepared by dissolving {RuCl$_2$(CHPh)[P(C$_6$H$_{11}$)$_3$]$_2$} (1.22×10$^{-2}$ mmol) in 1 mL of anhydrous methylene chloride in an argon-filled drybox. The monomer CbzNB (9.8×10$^{-3}$ mol) was dissolved in 4 mL of methylene chloride and degassed via a freeze-pump-thaw cycle. After complete degassing, the catalyst solution was injected into the monomer solution by syringe. The pink solution was vigorously stirred at 30° C. for 20 min. NBMBr (1.22×10$^{-3}$ mol) was injected to the still-living reaction mixture and the solution was stirred for another 12 hrs at 30° C. The solution changed from pink to yellow after addition of NBMBr. The polymerization was terminated by the addition of a small amount of ethyl vinyl ether (0.5 mL). After termination, the solution was stirred for an additional 5 min and poly (CbzNB-b-NBMBr) was precipitated in excess of methanol and dried overnight in a vacuum system at room temperature to give a flaky white solid.

Figure 1:
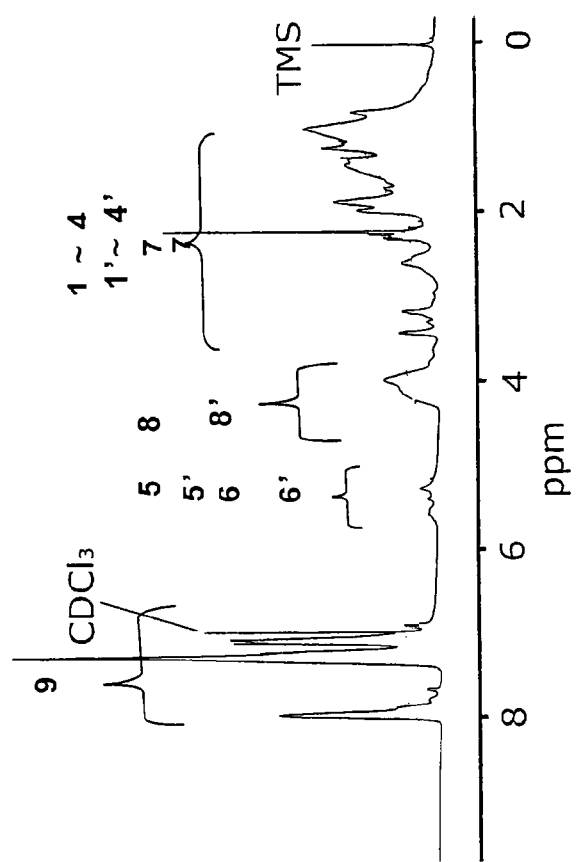

In the $^1$HnmR spectrum of poly(CbzNB-b-NBMBr)(FIG. 1 and FIG. 1A), signals due to the vinylic proton peaks of norbornene ring of NBMBr or CbzNB at about 5.90 and 6.00 ppm disappeared and the polymer showed new vinyl protons as broad signals between 5.10 and 5.80 ppm. Before hydrogenation, the resonance signals between 5.10 and 5.80 ppm for polynorbornene main chains and the aromatic resonances between 6.80 and 8.10 ppm for CbzNB were observed.

Figure 2:
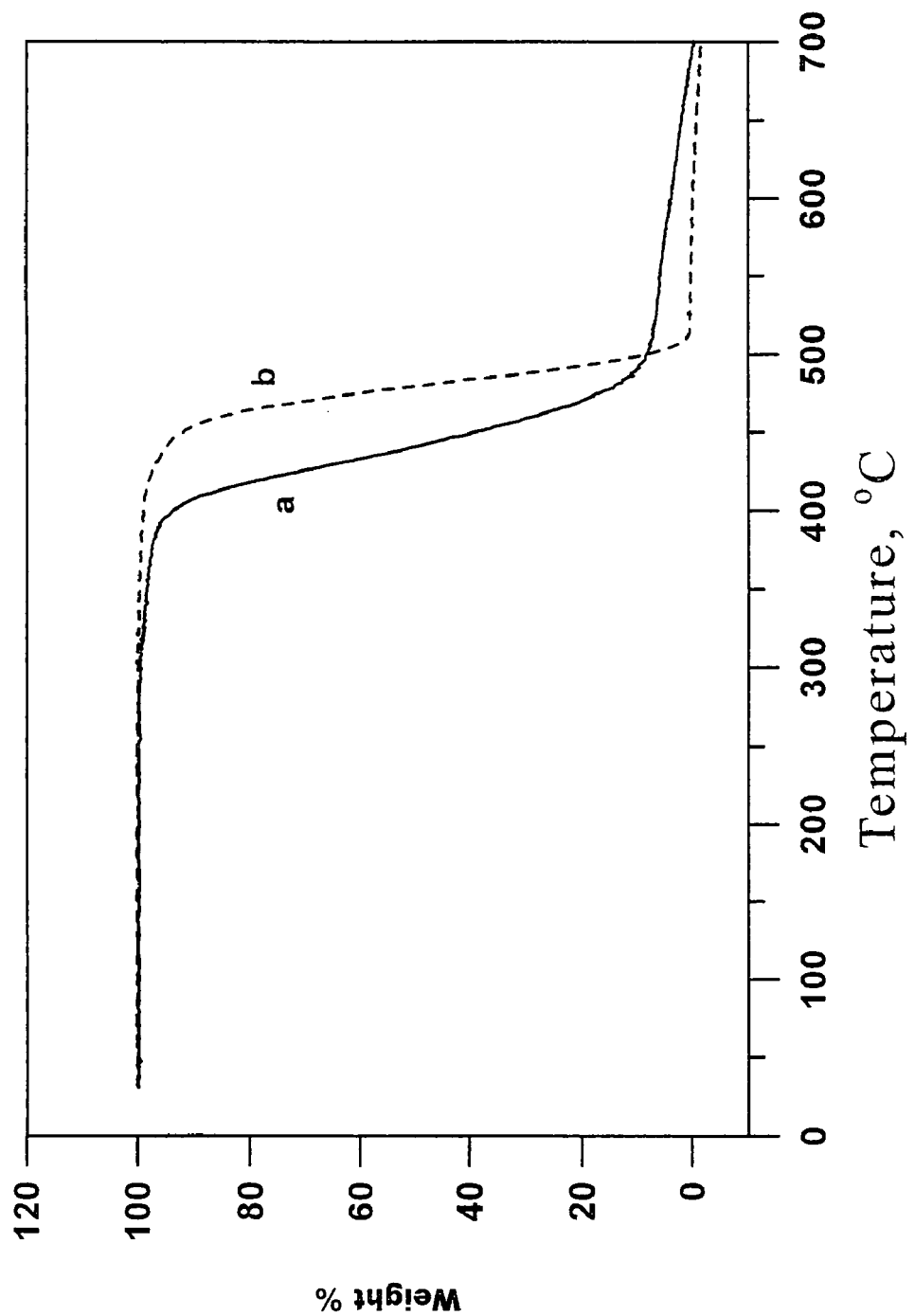
FIG. 2 shows TGA curves for a diblock copolymer containing carbazole and bromo groups [poly(NBCbz-b-NBMBr)] and its hydrogenated diblock copolymer [hydrogenated poly(NBCbz-b-NBMBr)] measured under air. Temperature was raised at a rate of 10° C. min$^{-1}$.

Thermogravimetric analysis (TGA): The polymer was fairly stable up to or above 300° C. as shown in FIG. 2.

Fluorescence emission: Poly(CbzNB-b-NBMBr) exhibited a strong carbazole fluorescence, with monomer emission occurring in the near-UV at approximately 380 nm and extending into the blue-violet region (330 nm excitation). A low-level emission observed at higher wavelengths (480 nm) was probably due to excimer formation.

Preparation of poly(CbzNB-b-NBMBr) was as follows:

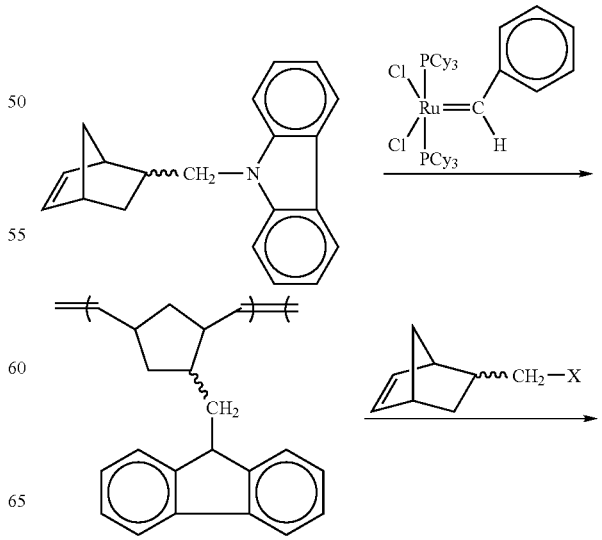

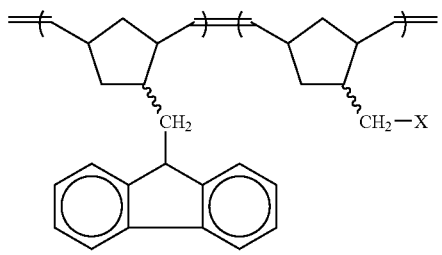

In the $^1$HnmR spectrum of hydrogenated poly(CbzNB-b-HNBMBr), the resonances between 5.10 and 5.80ppm due to protons of the double bond of polynorbornene main chain ceased and the aromatic resonances between 6.80 and 8.10 ppm for CbzNB appeared. The resonances between 0.50 and 4.50 ppm for aliphatic polynorbornene main chain were observed.

Thermogravimetric analysis (TGA): The polymer was fairly stable up to or above 420° C. as shown in FIG. 2(b).

Fluorescence emission: Hydrogenated poly(CbzNB-b-NBMBr)[poly(HCbzNB-b-HNBMBr)] exhibited a strong carbazole fluorescence, with monomer emission occurring in the near-UV at approximately 380 nm and extending into the blue-violet region(330 nm excitation). A low-level emission observed at higher wavelengths (480 nm) was probably due to excimer formation.

Hydrogenation of these carbazole-containing macroinitiators was as follows:

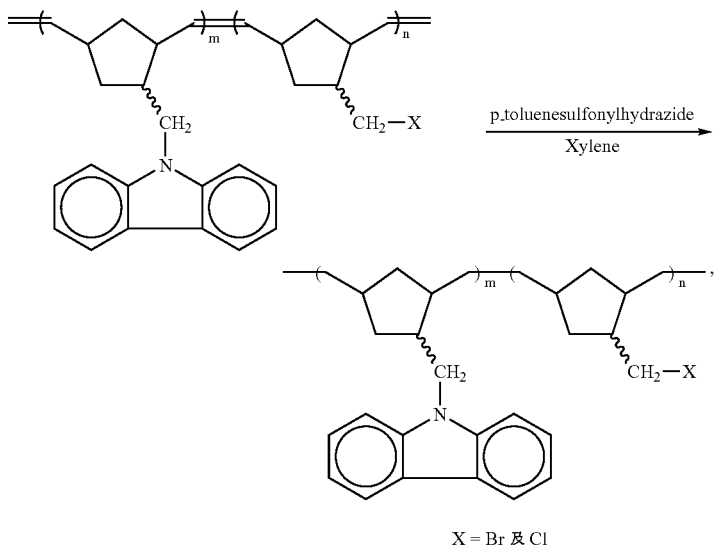

Example 4

Hydrogenation of the Carbazole-Containing Macroinitiator

Poly(CbzNB-b-NBMX, X=Br or Cl) [Poly(CbzN-B-b-N-BMBr) or Poly(CbzNB-b-NBMCl)] (0.2 g ) was dissolved in 20 mL of xylene in an ampoule. To the solution, 1.0 g of p-toluenesulfonylhydrazide as a hydrogenation agent and a trace of 2,6-di-tert-butyl-4-methylphenol were added. The ampoule containing the macroinitiator [Poly(CbzNB-b-NBMBr) or Poly(CbzNB-b-NBMCl)], solvent and hydrogenation agent was then degassed thrice via a freeze-pump-thaw cycle and sealed. The ampoule was gradually heated to 120° C. A homogeneous solution resulted at 100° C. The solution was stirred at 120° C. for 3 hrs until the generation of gas bubbles ceased. The solution was cooled to room temperature and precipitated from methanol. The macroinitiator [Hydrogenated Poly(CbzNB-b-NBMBr) or Hydrogenated Poly(CbzNB-b-NBMCl)] was purified by reprecipitation from methanol. Hydrogenated macroinitiator [Hydrogenated poly(CbzNB-b-NBMBr) or Hydrogenated Poly(CbzNB-b-NBMCl)] [Poly(HCbzNB-b-HNBMBr) or Poly(HCbzNB-b-HNBMCl)] was dried by freeze-drying.

Example 5

Preparation of Macromonomers With Norbornene End Group

Functional norbornenes containing halo end group in the invention are employed as initiators in order to prepare poly(methyl methacrylate) and poly(styrene) via radical polymerization of methyl methacrylate and styrene, respectively.

The structures of norbornene-containing macromonomers are as follows:

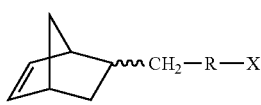

wherein X is Br or Cl; and

R is poly(methyl methacrylate) or poly(styrene).

Example 6

Preparation of Poly(MMA) With Norbornene Methylene End Group, NBMPMMA

To an ampoule, Cu(I)Br (1 mmol), 2,2'-bipyridine (1 mmol), norbornene methylene bromide (NBMBr)(1 mmol), methyl methacrylate(MMA)(100 mmol) and toluene (10 mL) were added. The heterogeneous mixture was placed under vacuum and degassed via a freeze-pump-thaw cycle thrice. After degassing, the reaction mixture in ampoule was stirred at 130° C. for 12 hrs. The polymer was precipitated from methanol and reprecipitated into methanol three times. A new macromonomer of α-norbornene methylene poly (methyl methacrylate)(NBMPMMA) was obtained. $\overline{Mn}=1.80\times10^5$ and PDI=1.3 by GPC(n=1800).

Preparation of norbornene-containing macromonomer with bromo end group was as follows:

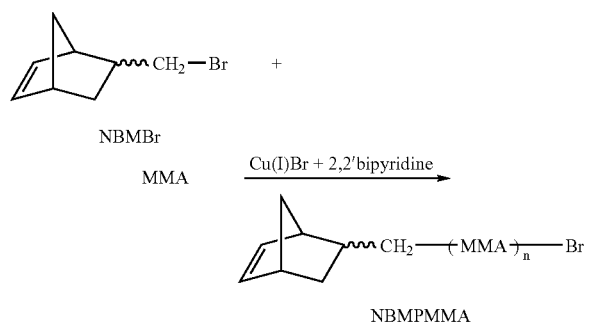

Cu(I)Br (1 mmol), 2,2'-bipyridine (1 mmol), norbornene methylene chloride (NBMCl)(1 mmol), methyl methacrylate(100 mmol) and toluene (10 mL) were used for preparation of choro-containing macromonomer as follows:

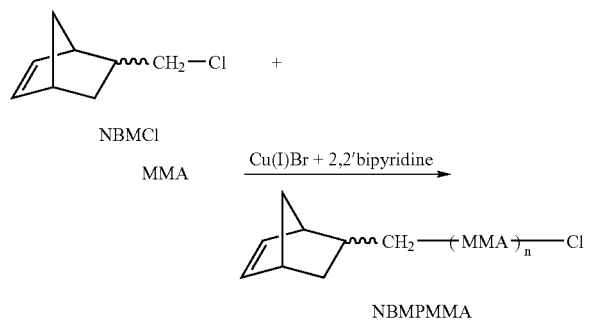

Example 7

Preparation of Poly(styrene) With Norbornene Methylene End Group, NBMPSt

To an ampoule, Cu(I)Br (0.38 g), 2,2'-bipyridine (1.25 g), norbornene methylene bromide (NBMBr)(0.5 g), styrene(8 g) and toluene (10 mL) were added. The heterogeneous mixture was placed under vacuum and degassed via a freeze-pump-thaw cycle thrice. After degassing, the reaction mixture in ampoule was stirred at 130° C. for 12 hrs. The polymer was precipitated from methanol and reprecipitated from THF into methanol three times. A new macromonomer of a -norbornene methylene polystyrene (NBMPSt) was obtained. $\overline{Mn}=1.60\times10^5$ and PDI=1.26 by GPC.

Thermal property: NBMPSt macromonomer ($\overline{Mn}=1.60\times10^5$) had a Tg of 107° C. (By DSC)for polystyrene segment.

Figure 3A:
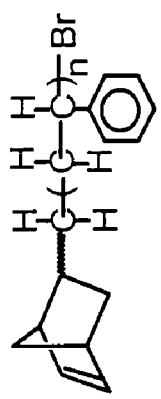
FIG. 3 and FIG. 3A show 400 MHz 1HnmR spectrum obtained in CDCl$_3$ at 25° C. for a macromonomer containing norbornene end group (NBMPStBr).
Figure 3:
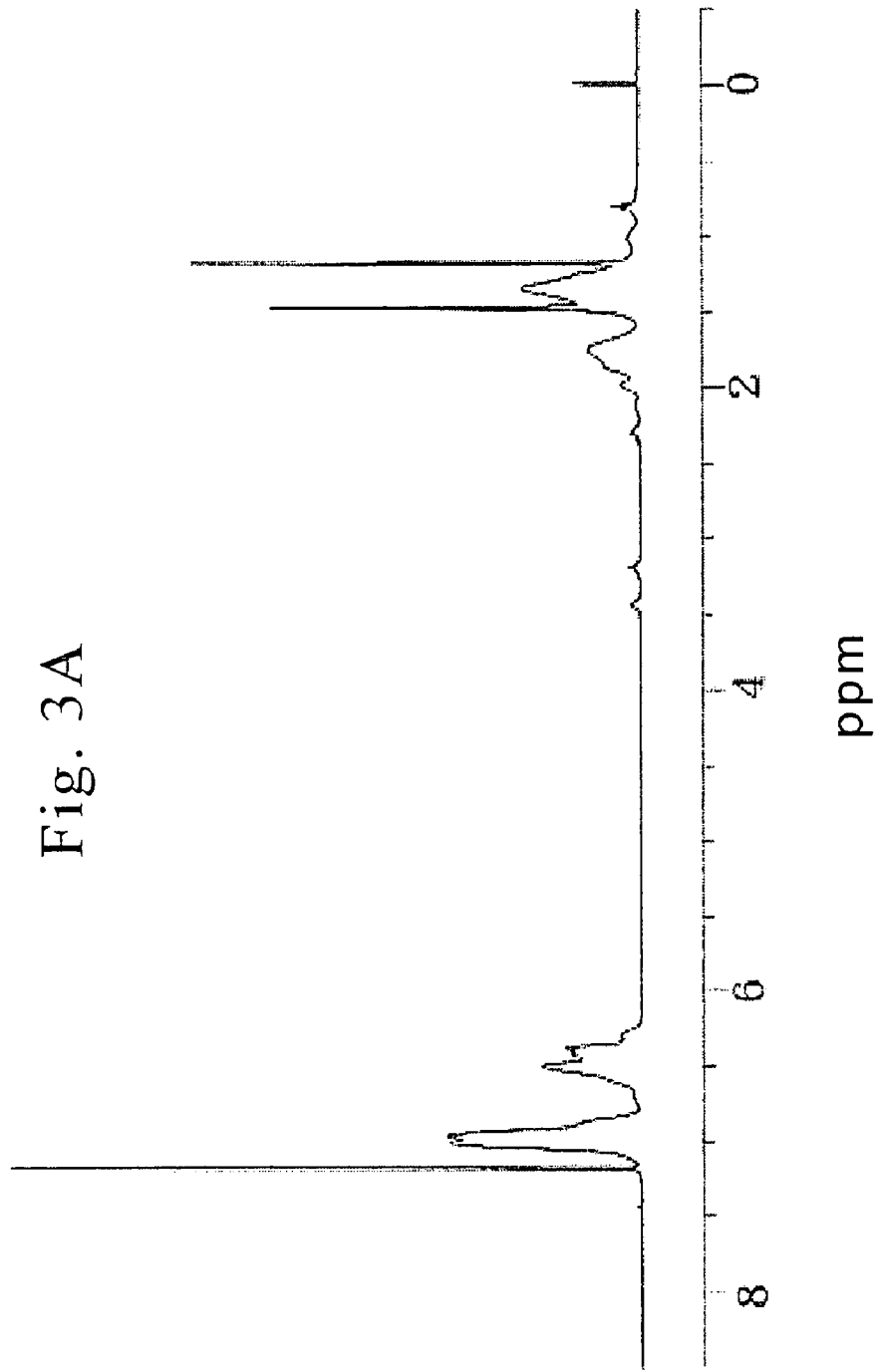

400 MHz $^1$HnmR spectrum obtained in CDCl$_3$ at 25° C. for NBMPSt macromonomer was shown in FIG. 3.

Preparation of NBMPSt macromonomer was as follows:

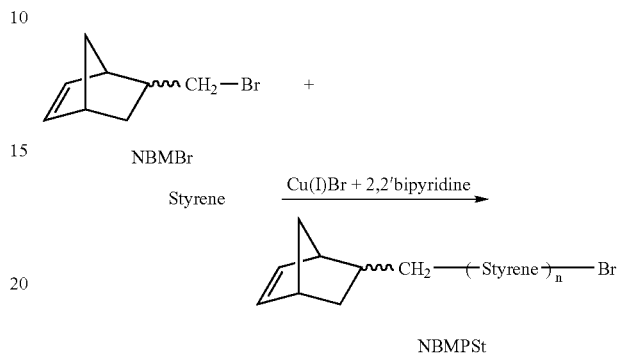

Example 8

Preparation of Halogen-Containing Polynorbornene

NBMBr (2.5 mmol) was dissolved in 4 mL of methylene chloride (CH$_2$Cl$_2$). After degassing by freeze-pump-thaw cycle, the solution of {RuCl$_2$(CHPh)[P(Cl$_8$H$_{15}$)]$_2$} (2.5× 10$^{-3}$ mmol) in 1 mL of methylene chloride was injected to the monomer solution. The solution was stirred for 2 hrs at 30° C. The reaction was terminated by the addition of a trace amount of ethyl vinyl ether (0.1 mL). The solution was continuously stirred for another 10 min and the polymer precipitated in excess of methanol. Poly(NBMBr) was obtained. NBMBr can be polymerized by ring-opening metathesis polymerization (ROMP) even containing functional bromo-end group of monomer. The high functional group tolerance of {RuCl$_2$(CHPh)[P(C$_{18}$H$_{15}$)]$_2$} has prompted an investigation of the use it as ring-opening metathesis polymerization (ROMP) catalyst in the formation of macroinitiators for radical polymerization.

The structure was as follows:

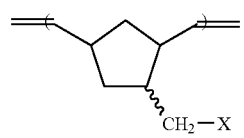

wherein X is Br or Cl.

Example 9

Preparation of a Grafted Copolymer With PMMA Derived From the Bromo-Containing Macroinitiator Via Radical Polymerization To an ampoule, Cu(I)Br (1 mmol), 2,2'-bipyridine (1 mmol), poly(NBMBr), (1 mmol) and methyl methacrylate (MMA) (100 mmol) were added in 10 mL toluene. The heterogeneous mixture was placed under vacuum and degassed via a freeze-pump-thaw cycle thrice. After degassing, the reaction mixture in ampoule was stirred at 100° C. for 12 hrs. The polymer was precipitated from methanol; dissolved in THF, and reprecipitated from methanol three times.

Graft copolymerization of bromo-containing macroinitiator [poly(NBMBr)] with methyl methacrylate (MMA) in toluene solution was as follows:

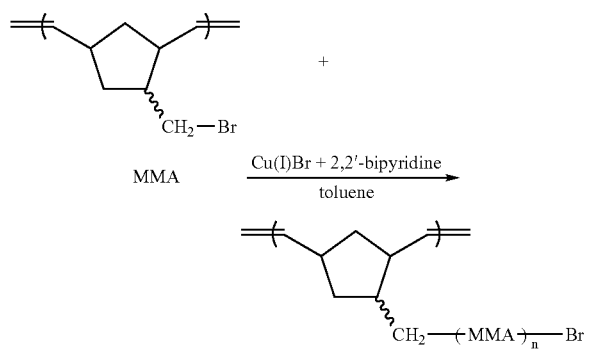

Bulk graft copolymerization of bromo-containing macroinitiator poly(NBMBr) was as follows:

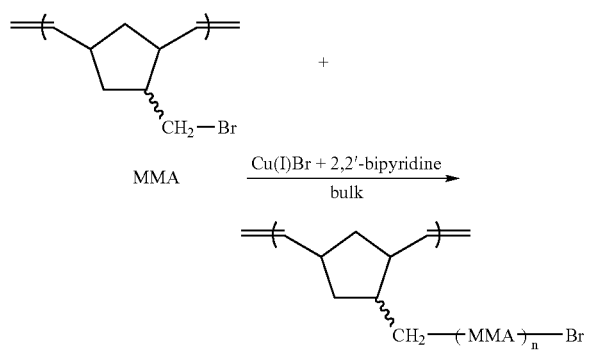

The reaction of poly(NBMCl) with Cu(I)Br and 2,2'-bipyridine in toluene was as follows:

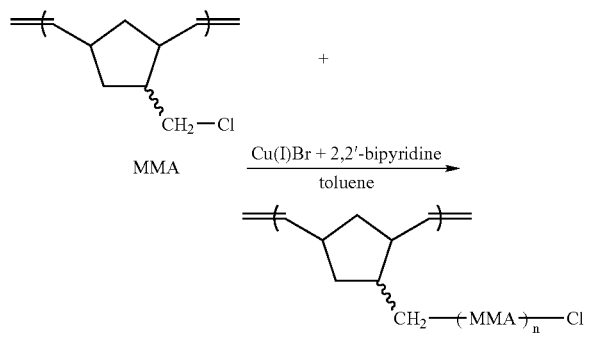

Bulk graft copolymerization of chloro-containing macroinitiator poly(NBMCl) was as follows:

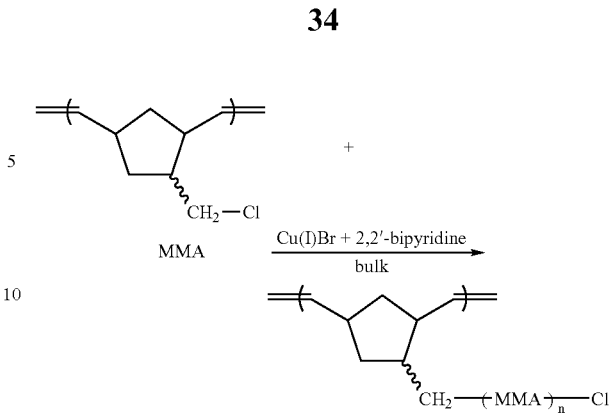

Example 10

Hydrogenation of Functional Polynorbornenes Containing Halo Side Group, Poly{(2-bromo methyl) bicyclo [2,2,1] hept-2-ene} [poly(NBMBr)] or poly{(2-chloro methyl)bicyclo [2,2,1] hept-2-ene} [poly(NBMCl)]

A functional polynorbornene containing halo side group, poly{(2-bromo methyl)bicyclo [2,2,1] hept-2-ene} [poly(NBMBr)] or poly{(2-chloro methyl)bicyclo [2,2,1] hept-2-ene} [poly(NBMCl)], (0.5 g) was dissolved in 50 mL of xylene in an ampoule. To the solution, 2.75 g (7.5 equiv. relative to the repeating unit) of p-toluenesulfonylhydrazide as a hydrogenation agent and a trace of 2,6-di-tert-butyl-4-methylphenol were added. The ampoule containing the polymer, solvent and hydrogenation agent was then degassed thrice via a freeze-pump-thaw cycle and sealed. Then, it was gradually heated to 120° C. A homogeneous solution resulted at 100° C. The solution was stirred at 120° C. for 3 hr until the generation of gas bubbles ceased. The solution was cooled to room temperature and precipitated in methanol. The polymer was purified by reprecipitation in methanol. The hydrogenated polymer, hydrogenated poly(NBMBr) or hydrogenated poly(NBMCl), was dried under vacuum overnight at room temperature.

The synthetic scheme is shown as the following:

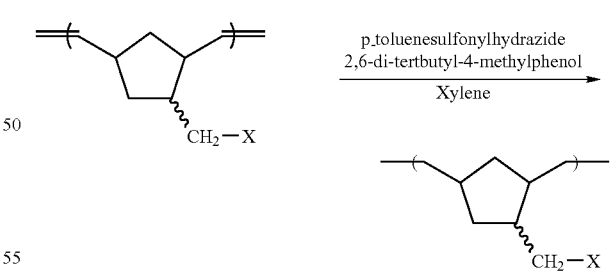

wherein X is Br or Cl.

Example 11

Preparation of a Grafted Copolymer With PMMA Using the Hydrogenated Bromo-Containing Macroinitiator [Hydrogenated Poly(NBMBr) or Hydrogenated Poly(NBMCl)] Via ATRP To an ampoule, Cu(I)Br (1 mmol), 2,2'-bipyridine (1 mmol), poly(NBMBr), (1 mmol) and methyl methacrylate (MMA) (100 mmol) were added in 10 mL toluene. The heterogeneous mixture was placed under vacuum and degassed via a freeze-pump-thaw cycle thrice. After degassing, the reaction mixture in ampoule was stirred at 100° C. for 12 hrs. The polymer was precipitated from toluene into methanol; dissolved in THF and reprecipitated from methanol three times.

The reaction in toluene was as follows:

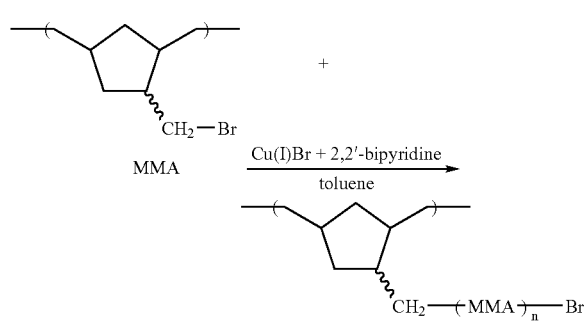

The bulk polymerization was as follows:

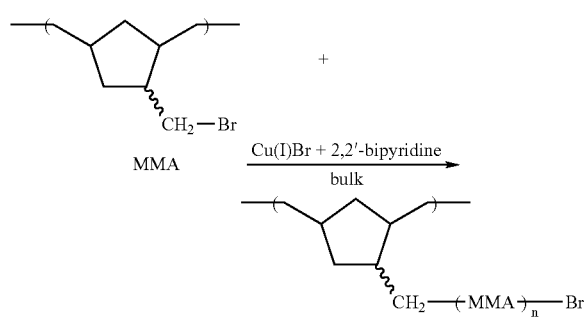

The reaction of norbornene chloride with Cu(I)Br and 2,2'-bipyridine in toluene was as follows:

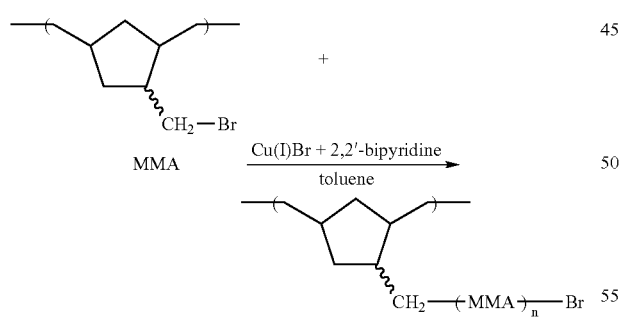

The bulk reaction of norbornene chloride with Cu(I)Br and 2,2'-bipyridine was as follows:

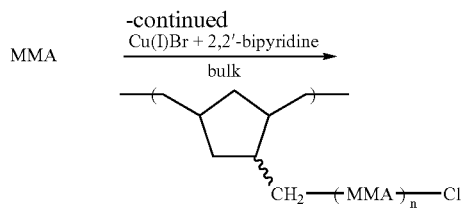

Example 12

Preparation of a Functional Copolynorbornene Containing Carbazole Groups and Polystyrnene Segments To an ampoule, Cu(I)Br (1 mmol), 2,2'-bipyridine (1 mmol), norbornene methylene bromide(NBMBr)(1 mmol) and styrene(St) (100 mmol) were added in 10 mL toluene. The heterogeneous mixture was placed under vacuum and degassed via a freeze-pump-thaw cycle thrice. After degassing, the reaction mixture in ampoule was stirred at 100° C. for 12 hrs. The macromonomer containing polystyrene segments (NBMPStBr) was precipitated from methanol. Polymer was dissolved in THF and reprecipitated from methanol three times. Number average molecular weight of (NBMPStBr) is 160000 and PDI is 1.28(by GPC).

Furthermore, copolymerization of a macromonomer containing polystyrene segments (NBMPStBr) and a carbazole-containing norbornene derivative was carried out by ring-opening metathesis polymerization. A functional copolynorbornene containing carbazole groups and polystyrnene segments was obtained.

Figure 4A:
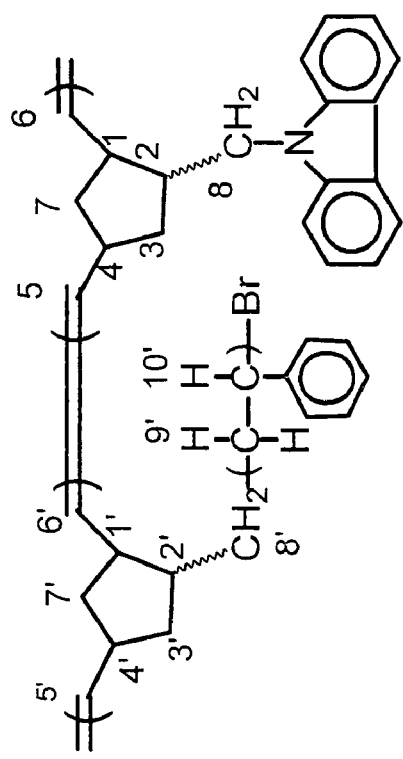
FIG. 4 and FIG. 4A show 400 MHz 1HnmR spectrum obtained in CDCl$_3$ at 25° C. for branched random poly (NBCbz-co-NBMPStBr).
Figure 4:
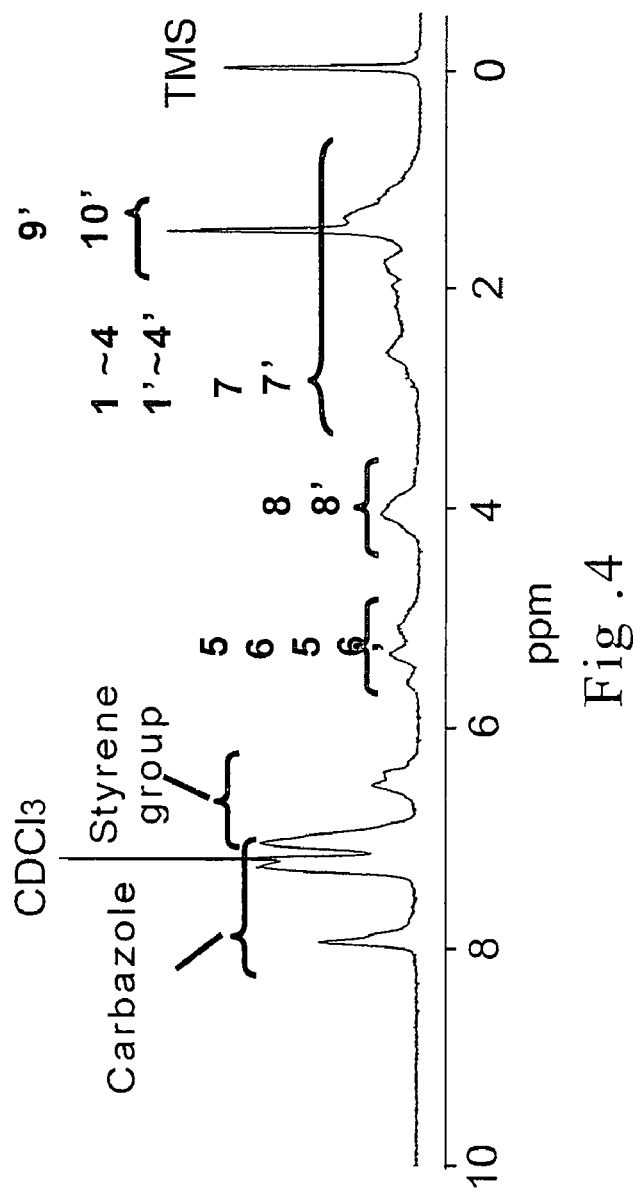

The $^1$HnmR(400 MHz) spectrum of branched random poly(NBCbz-co-NBMPStBr) obtained in CDCl$_3$ at 25° C. which is shown in FIG. 4 and FIG. 4A.

Number average molecular weight of poly(NBCbz-co-NBMPStBr) is 399000 and PDI is 1.30' yield=95%.

Thermal properties were determined by DSC:

Tg=105° C.[Poly(styrene) segment] and Tg=165° C.[Poly(NBCbz) segment].

The structure of poly(NBCbz-co-NBMPStBr) was as follows:

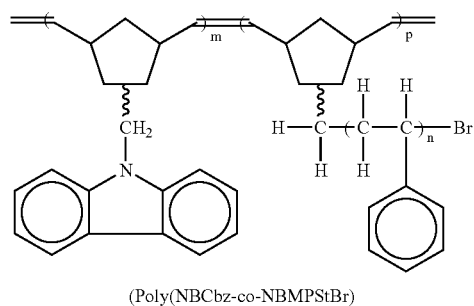

(Poly(NBCbz-co-NBMPStBr))

Example 13

Preparation of Norbornene Methylene Amine (NBMA)

The norbornene derivative of norbornene methylene amine (NBMA) is mainly produced by the reaction of cyclopentadiene (66 g) and allyl amine (50 g). The required reaction condition of the Diels-Alder reaction in the invention is usually controlled at 180° C. for 8 hrs in the presence of hydroquinone (1 g) as a inhibitor. The boiling point of allyl amine is 55-58° C., so the reaction needs to be carried out in autocalve. The resulting solution is distilled under vacuum to obtain norbornene methylene amine (NBMA) (bp=59~61° C./11 mmHg).

Synthesis was as follows:

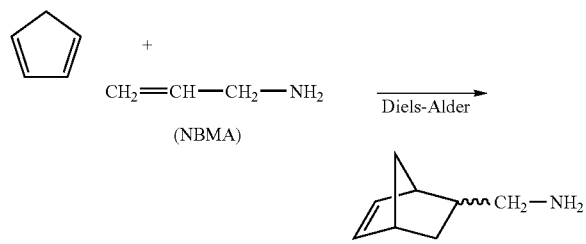

Example 14

Preparation of a Functional Norbornene Containing 2-bromo-2-methyl Propionyl End Group [2-bromo-2-methyl Propionyl Methyl] bicyclo[2,2,1]hept-2-ene; NBTMBr]

The monomer, (2-bromo-2-methyl propionyl methyl) bicyclo[2,2,1]hept-2-ene, was prepared via the reaction of 5-norbornen-2-methylene amine(NBMA) and 2-bromo-2-methylpropionyl bromide. A solution of 5-norbornen-2-methylene amine (1.11 g, 1 mmol) in methylene chloride (30 mL) and triethylamine (TEA) (1.01 g, 1 mol) were charged into a flask (150 mL) maintained at 0° C. in an ice bath. 2-Bromo-2-methylpropionyl bromide (2.30 g, 1 mol) was dissolved in methylene chloride (20 mL), then added to the solution by a drop funnel over a period of 30 min and stirred for another hour. After completion of the reaction, the organic layer was washed with distilled water (four times) and dried over sodium sulfate. After removing the solvent, a light yellow solid, 2-bromo-2-methyl propionyl-containing functional norbornene derivative[(2-bromo-2-methyl propionyl methyl) bicyclo[2,2,1]hept-2-ene; NBTMBr], was obtained. The functional norbornene monomer [(2-bromo-2-methyl propionyl methyl) bicyclo[2,2,1]hept-2-ene; NBTMBr] was purified by crystallization from n-hexane; m.p.=84.9° C. (by DSC) and exo/endo was measured to be 15:85 both by $^1$HnmR and $^{13}$CnmR spectroscopies. Elemental ANAL. Calculated for $C_{15}H_{21}O_4N$: C, 52.94%; H, 6.62%; N, 5.15%; found: C, 52.80%; H, 6.52%; N, 4.98%. The $^1$HnmR and $^{13}$CnmR spectra of the functional norbornene monomer [(2-bromo-2-methyl propionyl methyl) bicyclo[2,2,1]hept-2-ene; NBTMBr] agree satisfactorily with the proposed structure.

$^1$HnmR (CDCl$_3$): δ(ppm)=0.5 ($H_{n3n}$), 1.2 ($H_{x3x}$), 1.3 ($H_{n7a}$), 1.37 ($H_{n7s}$), 1.5 ($H_{x7as}$), 1.54 ($H_{x2n}$), 1.7 ($H_{n3x}$), 1.8 ($H_{10}$), 2.2 ($H_{n2x}$), 2.54 ($H_{x4}$), 2.75 ($H_{n4}$), 2.78 ($H_{x1}$), 2.85 ($H_{x1}$), 2.9 ($H_{n8}$), 2.97 ($H_{x8}$)'5.9 ($H_{n6}$), 6.0 ($H_{x5}$,$H_{x6}$), 6.1 ($H_{n5}$), 6.73 ($H_9$).

$^{13}$CnMR (CDCl$_3$): δ(ppm)=30 ($C_{n3n}$), 30.7 ($C_{x3x}$), 32.6 ($C_{10}$), 38.7 ($C_{x2}$), 39.0 ($C_{n2x}$), 42.5($C_3$), 44.3 ($C_{x1}$), 44.4 ($C_{x4}$), 45.2 ($C_{n4}$), 45.6 ($C_{n1}$), 49.7 ($C_{n7}$), 63.5 ($C_{n8}$), 132.1 ($C_{n7}$), 136.3 ($C_{x6}$), 137 ($C_{n5}$), 171.5 ($C_9$).

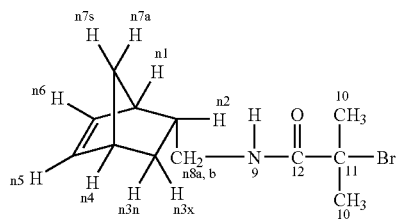

endo

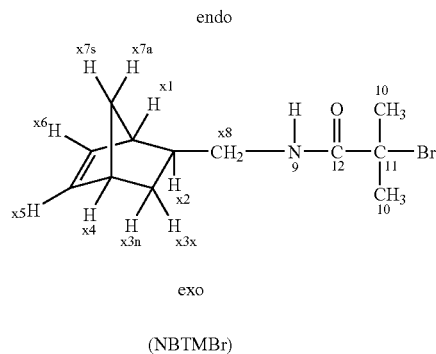

exo (NBTMBr)

Melting point:84.9° C.

Solubility : 2-Bromo-2-methyl propionyl-containing functional norbornene derivative[(2-bromo-2-methyl propionyl methyl) bicyclo[2,2,1]hept-2-ene; NBTMBr] is soluble in acetone, pyridine, ethanol, methanol, methylene chloride, tetrahydrofuran, N,N-dimethylformamide (DMF) and dimethylsulfoxide (DMSO) at room temperature; completely in N,N-dimethylacetamide (DMAc) at 60° C.; and partially in toluene, benzene, hexane and N-methyl-2-pyrrolidinone (NMP) at 60° C.

The preparation of 2-bromo-2-methyl propionyl-containing functional norbornene derivative [(2-bromo-2-methyl propionyl methyl) bicyclo[2,2,1]hept-2-ene; NBTMBr] was as follows:

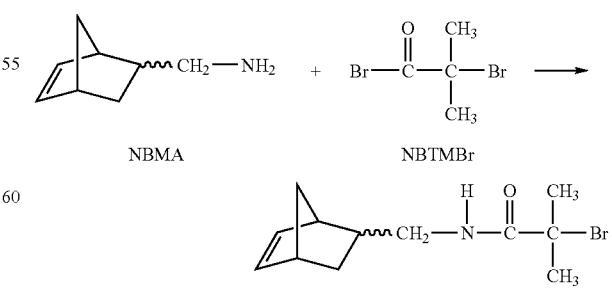

Similarly, various functional norbornene derivatives can be obtained as follows:

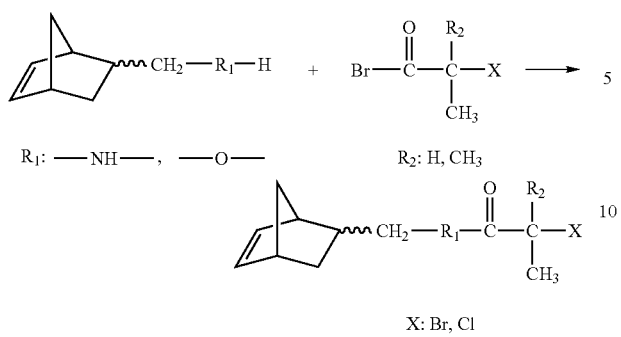

Example 15

Preparation of Polynorbornene Containing Bromo-Side Group, (2-bromo-2-methyl Propionyl Methyl) Bicyclo[2,2,1]hept-2-ene [poly(NBMBrMP)]

For example, preparation of functional polynorbornene containing 2-bromo-2-methyl propionyl-side group, (methyl) bicyclo[2,2,1]hept-2-ene [poly(NBMBrMP)] is carried out with [M]/[I]=520. A solution of catalyst was prepared by dissolving RuCl2(CHPh)[P(C6H11)3]2 (0.001 g, 1.22×10-6 mol) in 1 mL of anhydrous methylene chloride in an argon-filled dry box. The monomer (0.22 g, 1.22×10-3 mol) was dissolved in 5 mL of methylene chloride and degassed via a freeze-pump-thaw cycle. After complete degassing of the reaction mixture, the catalyst solution was injected into the monomer solution by syringe. The pink solution was vigorously stirred at room temperature for 24 hr and the color changed from pink to yellow. The reaction was terminated by the addition of a small amount of ethyl vinyl ether (0.5 mL). After termination, the solution was stirred for an additional 5 min and the polymer, poly(NBMBrMP), was precipitated in excess of methanol and dried overnight in a vacuum system at room temperature to give a flaky white solid.

$^1$HnmR (CDCl$_3$): δ(ppm)=5.5~5.2 (H$_5$, H$_6$), 1.9 (H$_{10}$), 7.2 (H$_9$), 3.8~0.8 (H$_1$, H$_2$, H$_3$, H$_4$, H$_7$, H$_8$). $^{13}$CnmR (CDCl$_3$): δ 24.6~52.5 (C$_1$, C$_2$, C$_3$, C$_4$, C$_8$), 67.0 (C$_{11}$), 129.0~134.1 (C$_5$, C$_6$), 170.8 (C$_{12}$). The $^1$HnmR and $^{13}$CnmR spectra agree satisfactorily with the proposed structure.

Polymerization of the functional norbornene containing a halo end group was carried out with various [M]/[I] ratios by ring-opening metathesis polymerization. The resulting functional polynorbornene with various molecular weights and PDI values derived from the functional norbornene was obtained. [M]/[I]=260, $\overline{Mn}$=45000, $\overline{Mw}/\overline{Mn}$=1.22; [M]/[I] = 425, $\overline{Mn}$=138000, $\overline{Mw}/\overline{Mn}$=1.33; [M]/[I]=520, $\overline{Mn}$=139000, $\overline{Mw}/\overline{Mn}$=1.35; [M]/[I]=780, $\overline{Mn}$=200000, $\overline{Mw}/\overline{Mn}$=1.42; [M]/[I]=1100, $\overline{Mn}$=314000, $\overline{Mw}/\overline{Mn}$=1.56.

Solubility: The poly(NBMBrMP) ([M]/[I]=520) containing bromo side chains is soluble in pyridine, methylene chloride, tetrahydrofuran (THF), N,N-dimethylformamide (DMF) and N-methyl-2-pyrrolidinone (NMP) at room temperature; completely in benzene, N,N-dimethylacetamide (DMAc) and dimethylsulfoxide (DMSO) at 60° C.; and partially in toluene at 60° C.

Synthesis was as follows:

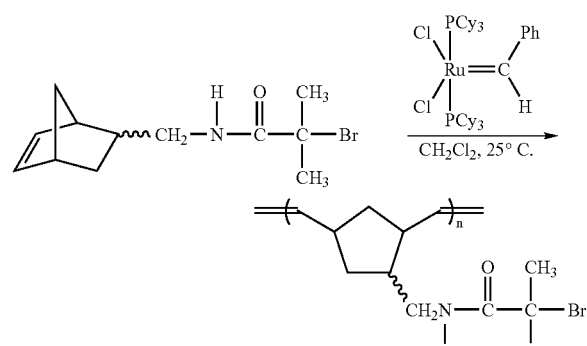

Example 16

Hydrogenation of Polynorbornene Containing Bromo-Side Group, Poly{(2-bromo-2-methylpropionylmethyl)bicyclo[2,2,1]hept-2-ene} [poly(NBMBrMP)]

Poly(NBMBrMP) (0.5 g) was dissolved in 50 mL of xylene in an ampoule. To the solution 2.75 g (7.5 equiv. relative to the repeating unit) of p-toluenesulfonylhydrazide as a hydrogenation agent and a trace of 2,6-di-tert-butyl-4-methylphenol were added. The ampoule containing the polymer, solvent and hydrogenation agent was then degassed thrice via a freeze-pump-thaw cycle and sealed. Then, it was gradually heated to 120° C. A homogeneous solution resulted at 100° C. The solution was stirred at 120° C. for 3 hr until the generation of gas bubbles ceased. The solution was cooled to room temperature and polymer was precipitated in methanol. The polymer was purified by reprecipitation in methanol. The hydrogenated polymer, hydrogenated poly(NBMBrMP), was dried under vacuum overnight at room temperature.

$^1$HnmR (CDCl$_3$): δ 0.8~3.8 (H$_1$, H$_2$, H$_3$, H$_4$, H$_5$, H$_6$, H$_7$, H$_8$), 1.9 (H$_{10}$), 6.7 (H$_9$). $^{13}$CnmR (CDCl$_3$): δ 18.7~50.0 (C$_1$, C$_2$, C$_3$, C$_4$, C$_8$), 67.7 (C$_{11}$), 170.8 (C$_{12}$).

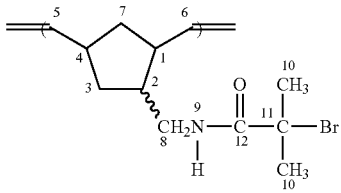

Solubility: The hydrogenated poly(NBMBrMP) was soluble in pyridine and methylene chloride at room temperature; completely in N,N-dimethylacetamide (DMAc) and N,N-dimethylformamide (DMF) at 60° C.; and partially in tetrahydrofuran (THF), ethyl acetate (EA), N-methyl-2-pyrrolidinone (NMP) and dimethylsulfoxide (DMSO) at 60° C.

Synthesis was as follows:

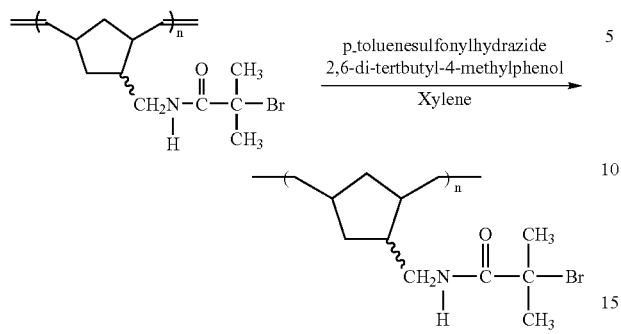

Example 17

Synthesis of Grafted Copolymer of Hydrogenated Poly(NBMBRMP) With Polymethyl Methacrylate Via ATRP

To an ampoule, Cu(I)Br (0.143 g), 2,2'-bipyridine (0.156 g), hydrogenated poly(NBMBrMP)[poly(HNBMBrMP), $\overline{Mn}$=1.3×10$^4$, PDI=1.9] (0.5 g) and methyl methacrylate (1 g) were added in 50 mL toluene. The heterogeneous mixture was placed under vacuum and degassed via a freeze-pump-thaw cycle thrice. After degassing, the reaction mixture in the ampoule was stirred at 100° C. for 12 hr. The polymer, poly(HNBMBrMP-g-PMMA) [$\overline{Mn}$=2.0×10$^4$, PDI=1.9], was precipitated from methanol. The polymer was purified by dissolving in THF and reprecipitating from methanol three times. $^1$HnmR (CDCl$_3$): δ(ppm)=0.8~3.8 (H$_1$, H$_2$, H$_3$, H$_4$, H$_7$, H$_8$), 1.9 (H$_{10}$), 6.7 (H$_9$). $^{13}$CnmR (CDCl$_3$): δ 29.9~63.9 (C$_1$, C$_2$, C$_3$, C$_4$, C$_5$, C$_6$, C$_7$, C$_8$, C$_e$, C$_f$, C$_g$), 172.1~172.3 (C$_i$, C$_{12}$).

Synthesis was as follows:

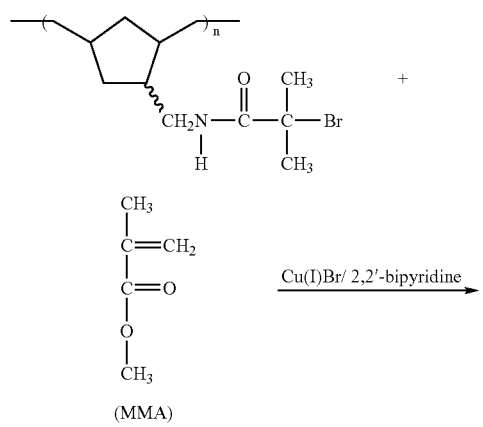

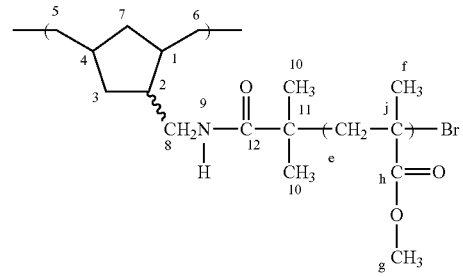

Example 18

Preparation of Bromo-Containing α-norbornyl Polymethyl Methacrylate Macromonomer (NBPMMA) Via Atom Transfer Radical Polymerization

Simple alkyl halides were used for atom transfer radical polymerization as initiators and copper(I) complexes as catalysts. Both of these are inexpensive and readily available.

To an ampoule, Cu(DBr (0.71 g), 2,2'-bipyridine (0.65 g), 2-bromo-2-methyl propionyl methyl} bicyclo[2,2,1]hept-2-ene (1.3 g) and methacrylate (5 g) were added. The heterogeneous mixture was placed under vacuum and degassed via a freeze-pump-thaw cycle thrice. After degassing, the reaction mixture in the ampoule was stirred at 100° C. for 12 hrs. The polymer was purified by dissolving in THF and reprecipitating from methanol three times. $\overline{Mn}$=6.4×10$^3$ and PDI=1.5 as measured by GPC. Yield=72%. The $^1$HnmR spectrum of the a -norbomyl polymethyl methacrylate macromonomer (NBPMMA) was recorded. The signals associated with the vinylic protons of norbornene were observed at 5.17~5.28 ppm. The signals due to saturated chain were in the region (1.0~3.5 ppm) and polymethyl methacrylate segment [—CH$_2$C(CH$_3$)COOCH$_3$: 2.10 ppm; -CH$_2$C(CH$_3$)COOCH$_3$: 0.87, 1.04, 1.90 ppm; —CH$_2$C(CH$_3$)COOCH$_3$: 3.60 ppm] of the spectrum provided further confirmation of the macromonomer (NBPMMA) structure. $^{13}$CnmR (CDCl$_3$): δ 17.0~68.0 (C$_1$, C$_2$, C$_3$, C$_4$, C$_7$, C$_8$, C$_e$, C$_f$, C$_g$), 127.0~130.0 (C$_5$, C$_6$), 175.0~180.0 (C$_h$, C$_{12}$). The macromonomer (NBPMMA) had a glass transition temperature (Tg) of 110° C. for polymethyl methacrylate segment.

he macromonomer with various average number molecular weight ($\overline{Mn}$) and PDI values were prepared with various reaction times. The macromonomer with $\overline{Mn}$=12900 and $\overline{Mw}/\overline{Mn}$=1.37 was obtained after 12 hrs. The macromonomer with $\overline{Mn}$=14700, $\overline{Mw}/\overline{Mn}$=1.44 was obtained after 24 hrs. The macromonomer with $\overline{Mn}$=16600, $\overline{Mw}/\overline{Mn}$=1.55 was obtained after 48 hrs.

Solubility: Macromonomer (NBPMMA) is soluble in methylene chloride, tetrahydrofuran(THF), N,N-dimethylacetamide (DMAc), pyridine and dichorobenzene at room temperature and in acetone, pyridine, benzene, N,N-dimethylformamide (DMF), ethyl acetate (EA), N-methyl-2-pyrrolidinone (NMP) and dimethylsulfoxide (DMSO) at 60° C.

Synthesis was as follows:

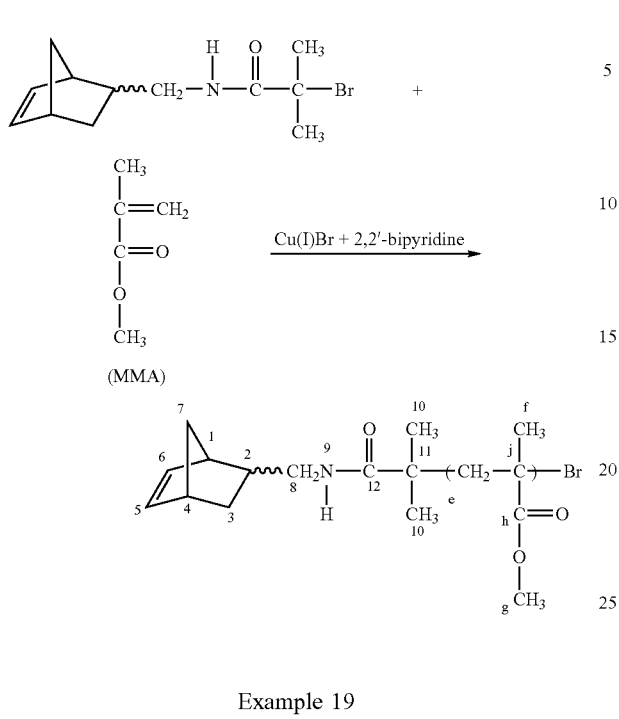

Example 19

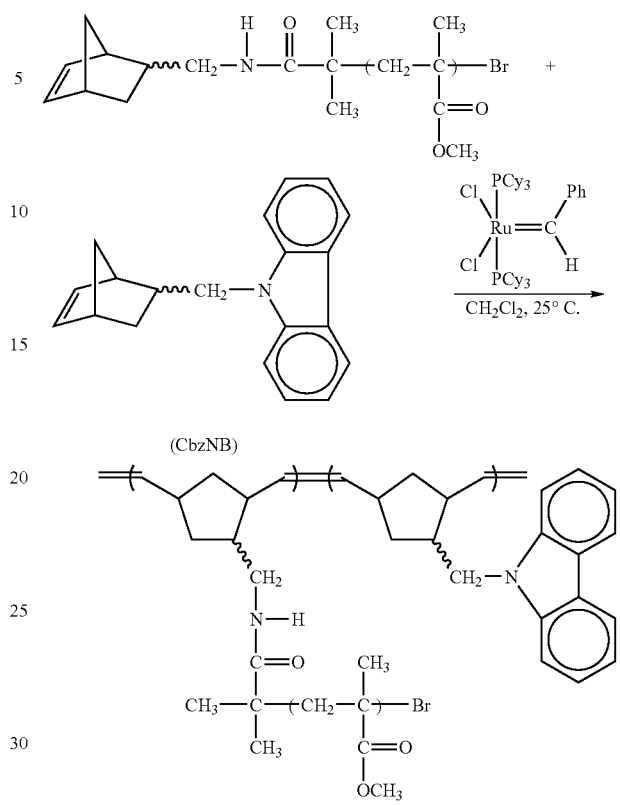

Preparation of Poly[α-norbornyl Polymethyl Methacrylate Macromonomer-co-5-(N-carbazolyl methyl)bicyclo [2.2.1]hept-2-en], Poly(NBPMMA-co-NBCbz), via Ring-Opening Metathesis Polymerization The α-norbornyl polymethyl methacrylate macromonomer (NBPMMA) with molecular weight ($\overline{Mn}$) exceeding $1.29 \times 10^4$ could not be homopolymerized via ring-opening metathesis polymerization (ROMP) by Ru catalyst [$(Cy_3P)_2 Cl_2Ru=CHPh$, Cy=cyclohexyl]. Copolymerization was carried out with norbornene derivative such as 5-(N-carbazolyl methyl)bicyclo[2.2.1]hept-2-ene (NBCbz). The resulting copolymer exhibited electro-optical properties and good thermal stability.

A catalyst solution was prepared by dissolving 1 mg of [$(Cy_3P)_2Cl_2Ru=CHPh$, Cy=cyclohexyl] in 1 mL of anhydrous methylene chloride under an argon-filled drybox. The α-norbornyl polymethyl methacrylate macromonomer (NBPMMA) (0.1 g) with $\overline{Mn}=1.29 \times 10^4$ and NBCbz (0.1 g) were dissolved in 5 mL of methylene chloride and the reaction mixture was degassed via a freeze-pump-thaw cycle thrice. After it was degassed completely, the catalyst solution was injected into the mixture by a syringe. The reaction mixture was stirred at 25° C. for 2 hrs. The random copolymer was precipitated from methanol and purified by dissolving in THF and reprecipitating from methanol three times. $\overline{Mn}=4.76 \times 10^4$ and PDI=1.78 (GPC). The structure of poly(NBPMMA-co-NBCbz) was confirmed by $^1$HnmR spectroscopy.

Figure 5:
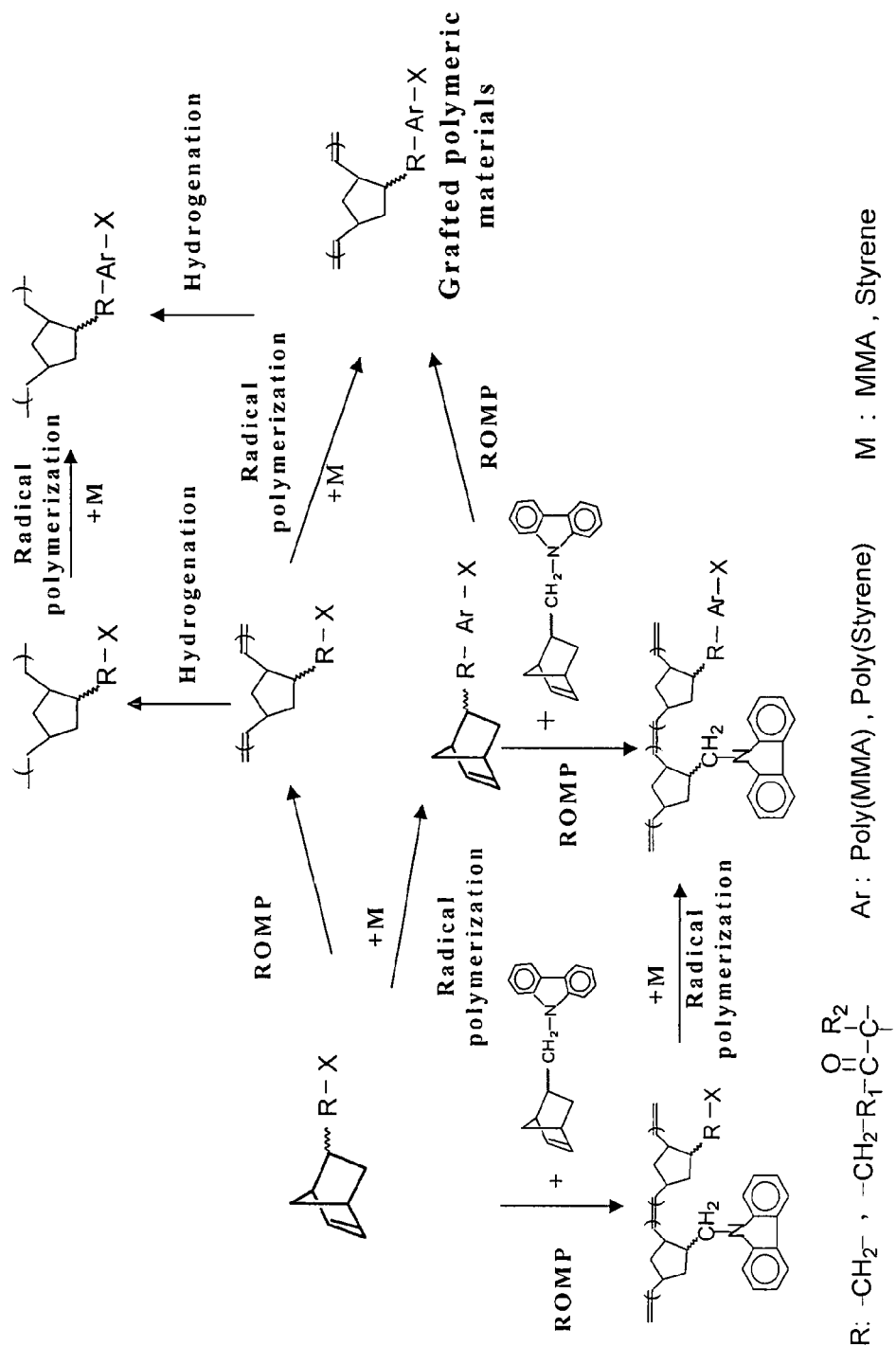
FIG. 5 shows a schematic drawing for various architectures and preparations according to the invention

The synthetic scheme is shown as following:

Furthermore, various architectures and preparations according to invention can be described with reference to a schematic drawing as shown in FIG. 5.

The invention provides a series of norbornene-type monomers which can initiate free-radical polymerization and a method for preparation thereof. A series of polymeric derivatives can be obtained by ring-opening metathesis polymerization, grafting polymerization and radical polymerization. The molecular weights of resulting polymeric derivatives are controllable. The polymers disclosed in the invention are transparent, excellent in heat resistance and optical characteristics. The resulting polymeric derivatives not only show the specific characteristic due to norbornene and polynorbornene but also provide an enhanced property.

While the invention has been described in terms of preferred embodiment, it is to be understood that the invention is not limited thereto. On the contrary, it is intended to cover various modifications and similar arrangements included within the spirit and scope of the appended claims which are to be accorded with the broadest interpretation so as to encompass all such modifications and similar structures. Therefore, the above description and illustration should not be taken as limiting the scope of the invention which is defined by the appended claims.

What is claimed is:

1. A grafted polynorbornene copolymer with the formula (XIV), which is prepared by using a thermally-stable saturated cyclic aliphatic macroinitiator with the formula (XIII) via graft copolymerization:

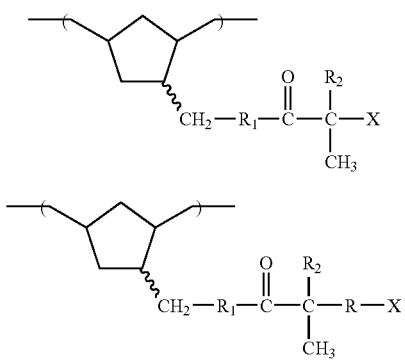

(XIII)

(XIV)

wherein, X is Br or Cl;
$R_1$ is —NH—, —O—, —(CH$_2$)n-NH—, or —(CH$_2$)n-O—,
wherein, n denotes an integer of 1 to 4;
$R_2$ is H or —CH$_3$; and
R is one selected from a group consisting of

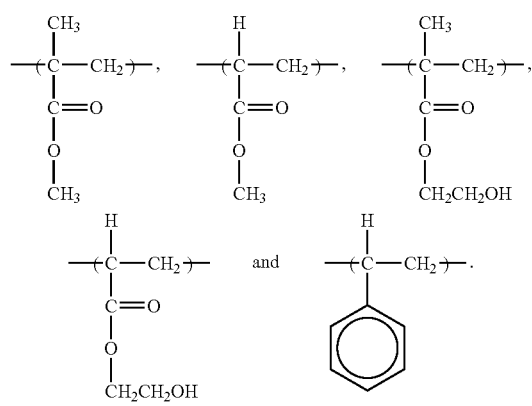

2. The grafted polynorbornene copolymer as claimed in claim 1, wherein the thermally-stable saturated cyclic aliphatic macroinitiator with the formula (XIII) is prepared by hydrogenating a macroinitiator with the formula (XII),

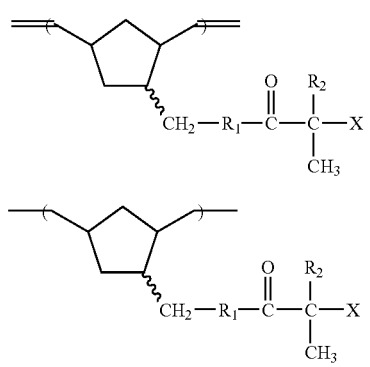

(XII)

(XIII)

wherein, X is Br or Cl;
$R_1$ is —NH—, —O—, —(CH$_2$)n-NH— or —(CH$_2$)n-O—, wherein, n denotes an integer of 1 to 4; and
$R_2$ is H or —CH$_3$.

3. The grafted polynorbornene copolymer as claimed in claim 2, wherein the macroinitiator with the formula (XII) is prepared from a halogen-containing norbornene-type compound (XI) in the presence of catalyst via ring-opening metathesis polymerization, wherein,

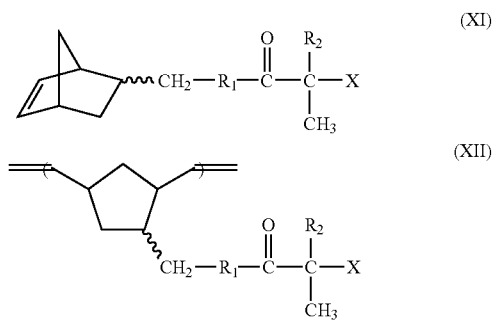

(XI)

(XII)

wherein, X is one selected from a group consisting of Br and Cl;
$R_1$ is —NH—, —O—, —(CH$_2$)n-NH—, or —(CH$_2$)n-O—, wherein n denotes an integer of 1 to 4; and
$R_2$ is H or —CH$_3$.

4. The grafted polynorbornene copolymer as claimed in claim 3, wherein said metathesis catalyst is {Cl$_2$Ru(CHPh)[P(C$_6$H$_{11}$)$_3$]$_2$}.

5. A method for preparing grafted polynorbornene copolymer with the formula (XIV) comprising the following steps:
a) polymerization of a norbornene monomer with the formula (XI) by using a catalyst via ring-opening metathesis polymerization to obtain a macroinitiator with the formula (XII);
b) hydrogenation of said macroinitiator with the formula (XII) to prepare a thermally-stable saturated cyclic aliphatic macroinitiator with the formula (XIII);
c) preparation of a mixture of Cu(I)Br, 2,2'-bipyridine, said thermally-stable saturated cyclic aliphatic macroinitiator (XIII) and a monomer selected from a group consisting of

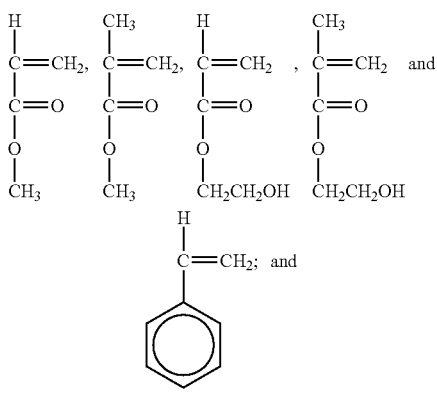

d) preparation of a grafted polynorbornene with the formula (XIV) by means of radical polymerization of said mixture at various temperatures ranged from 50 to 150° C., wherein,

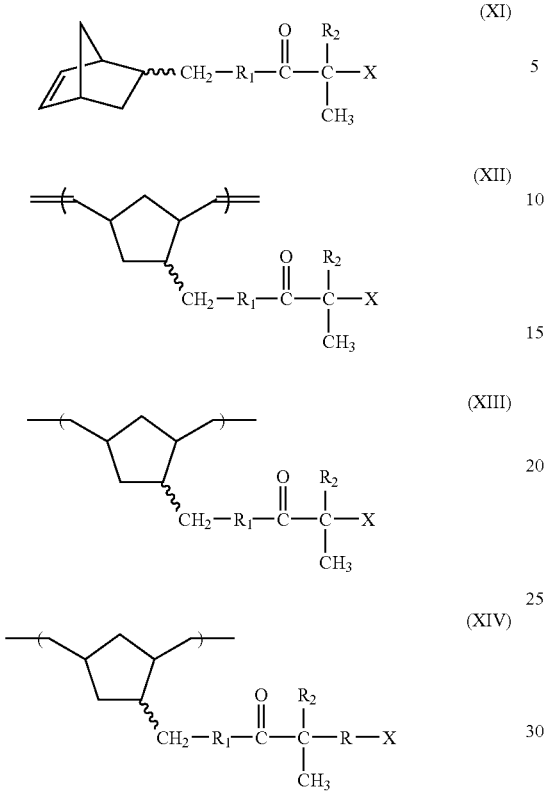

(XI)

(XII)

(XIII)

(XIV)

wherein, X is Br or Cl;
R$_1$ is —NH—, —O—, —(CH$_2$)n-NH— or —(CH$_2$)n-O—, wherein n denotes an integer of 1 to 4;
R$_2$ is H or —CH$_3$; and
R is one selected from a group consisting of

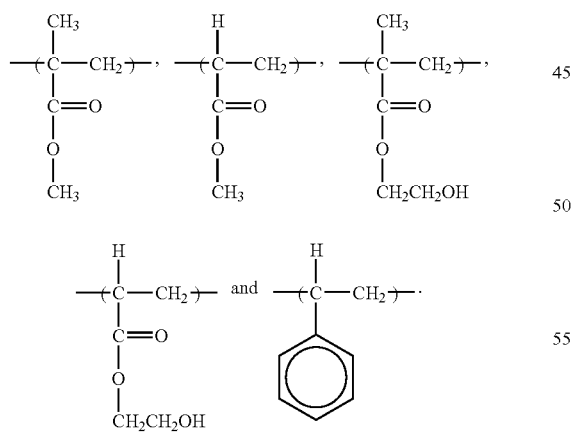

6. A method for preparing grafted polynorbornene copolymer with the formula (XIVA), comprising the following steps:

a) polymerization of a norbornene monomer with the formula (XI) by using a catalyst via ring-opening metathesis polymerization, to obtain a macroinitiator with the formula (XII);

b) preparation of a mixture of Cu(I)Br, 2,2'-bipyridine, said macroinitiator (XII) and a monomer selected from a group consisting of

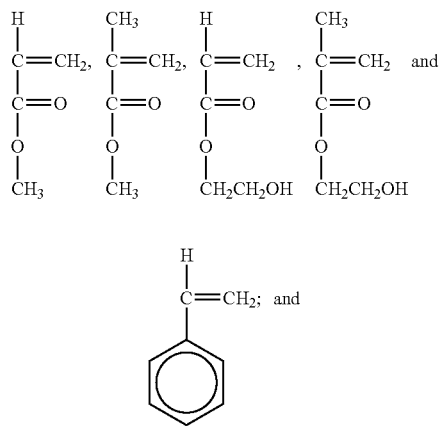

c) preparation of a grafted polynorbornene with the formula (XIVA) by means of radical polymerization of said mixture at various temperatures ranged from 50 to 150° C., wherein,

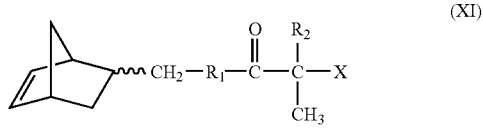

(XI)

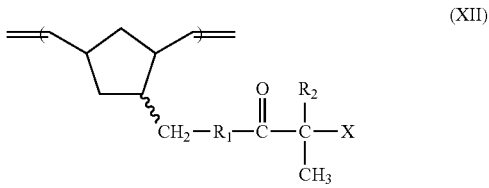

(XII)

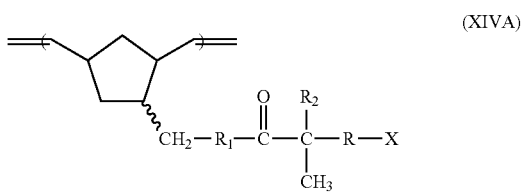

(XIVA)

wherein, X is Br or Cl;
R$_1$ is —NH—, —O—, —(CH$_2$)n-NH—, or —(CH$_2$)n-O—,
wherein, n denotes an integer of 1 to 4;
R$_2$ is H or —CH$_3$; and
R is one selected from a group consisting of

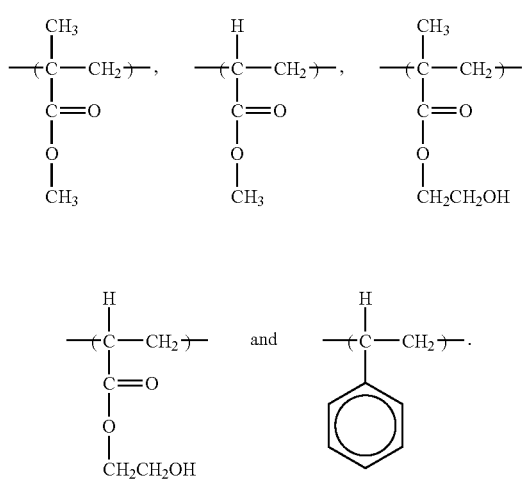
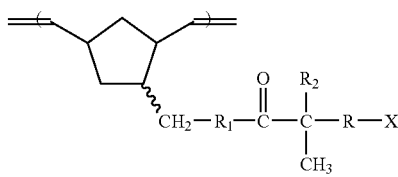 and
7. A grafted polynorbornene copolymer with the formula (XIVA), which is prepared by using the macroinitiator with the formula (XII) via graft copolymerization,
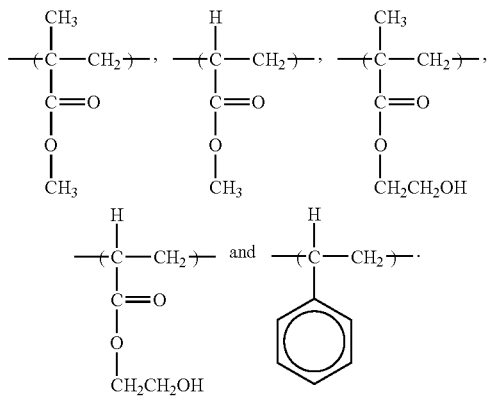
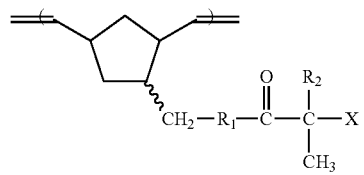
wherein, X is Br or Cl;
$R_1$ is —NH—, —O—, —($CH_2$)n-NH—, or —($CH_2$)n-O—,
wherein, n denotes an integer of 1 to 4;
$R_2$ is H or —$CH_3$; and
R is one selected from a group consisting of
* * * * *